United States Patent
Koishi et al.

(10) Patent No.: US 6,728,178 B2
(45) Date of Patent: Apr. 27, 2004

(54) SEMICONDUCTOR LASER CONTROL METHOD AND SEMICONDUCTOR LASER CONTROL DEVICE

(75) Inventors: Kenji Koishi, Hyogo (JP); Yoshiyuki Miyabata, Kyoto (JP); Makoto Usui, Osaka (JP); Kohjyu Konno, Osaka (JP); Yasuhiro Ueki, Kanagawa (JP); Tomonori Ueno, Kanagawa (JP); Yutaka Osada, Kanagawa (JP); Toru Fujimoto, Kanagawa (JP)

(73) Assignees: Matsushita Electric Industrial Co., Ltd., Osaka (JP); Victor Company of Japan Limited, Kanagawa (JP)

( * ) Notice: Subject to any disclaimer, the term of this patent is extended or adjusted under 35 U.S.C. 154(b) by 31 days.

(21) Appl. No.: 09/983,402

(22) Filed: Oct. 24, 2001

(65) Prior Publication Data

US 2002/0070329 A1 Jun. 13, 2002

(30) Foreign Application Priority Data

Oct. 27, 2000 (JP) .......................... 2000-328789

(51) Int. Cl.$^7$ ................................. H01S 3/10
(52) U.S. Cl. ................. 369/47.53; 369/116; 369/47.49
(58) Field of Search ............. 369/47.5, 44.29, 369/13.24, 44.32, 47.53, 47.52, 47.17, 116, 53.27, 44.35, 53.22, 53.23, 44.34, 53.14, 47.49, 47.19, 47.36; 372/38.09, 31, 26, 38.07, 29.011

(56) References Cited

U.S. PATENT DOCUMENTS 4,689,795 A * 8/1987 Yoshimoto et al. ........... 372/31
4,701,609 A   10/1987 Koishi et al. ................ 369/116
5,097,473 A *  3/1992 Taguchi .................. 372/29.011
5,231,625 A *  7/1993 Hokozono et al. .......... 369/116
5,255,007 A * 10/1993 Bakx .......................... 347/247
5,305,296 A *  4/1994 Kono ....................... 369/47.53
5,572,503 A * 11/1996 Satoh et al. ............. 369/47.17
5,590,111 A * 12/1996 Kirino et al. ............ 369/47.53
5,642,343 A *  6/1997 Toda et al. .............. 369/47.53
5,742,573 A *  4/1998 Hajjar et al. ............. 369/44.32
5,898,655 A *  4/1999 Takahashi ................ 369/47.53
6,058,077 A *  5/2000 Miyaoka .................. 369/13.24
6,240,055 B1 * 5/2001 Takamine et al. ......... 369/44.29
6,392,970 B1 * 5/2002 Fuji et al. ................... 369/47.5

FOREIGN PATENT DOCUMENTS

JP         2000-40231         2/2000

* cited by examiner

Primary Examiner—William Korzuch
Assistant Examiner—Kim-Kwok Chu
(74) Attorney, Agent, or Firm—Wenderoth, Lind & Ponack, L.L.P.

(57) ABSTRACT

Playback signal amplitude drops and continuity of the signal track amplitude is lost at the beginning the data recording area when data is incrementally written to optical discs such as DVD-R or DVD-RW media. Feed-forward control quickly settles semiconductor laser recording power to the target power level immediately after an incremental recording starts. While recording continues, feedback control maintains laser power at a desired recording power level even when the required current supply varies due to the temperature characteristics of the semiconductor laser when recording lasts for an extended period of time. A semiconductor laser control method and semiconductor laser control device thereby maintain laser power at a stable target recording power level quickly and for as long as recording continues.

23 Claims, 10 Drawing Sheets

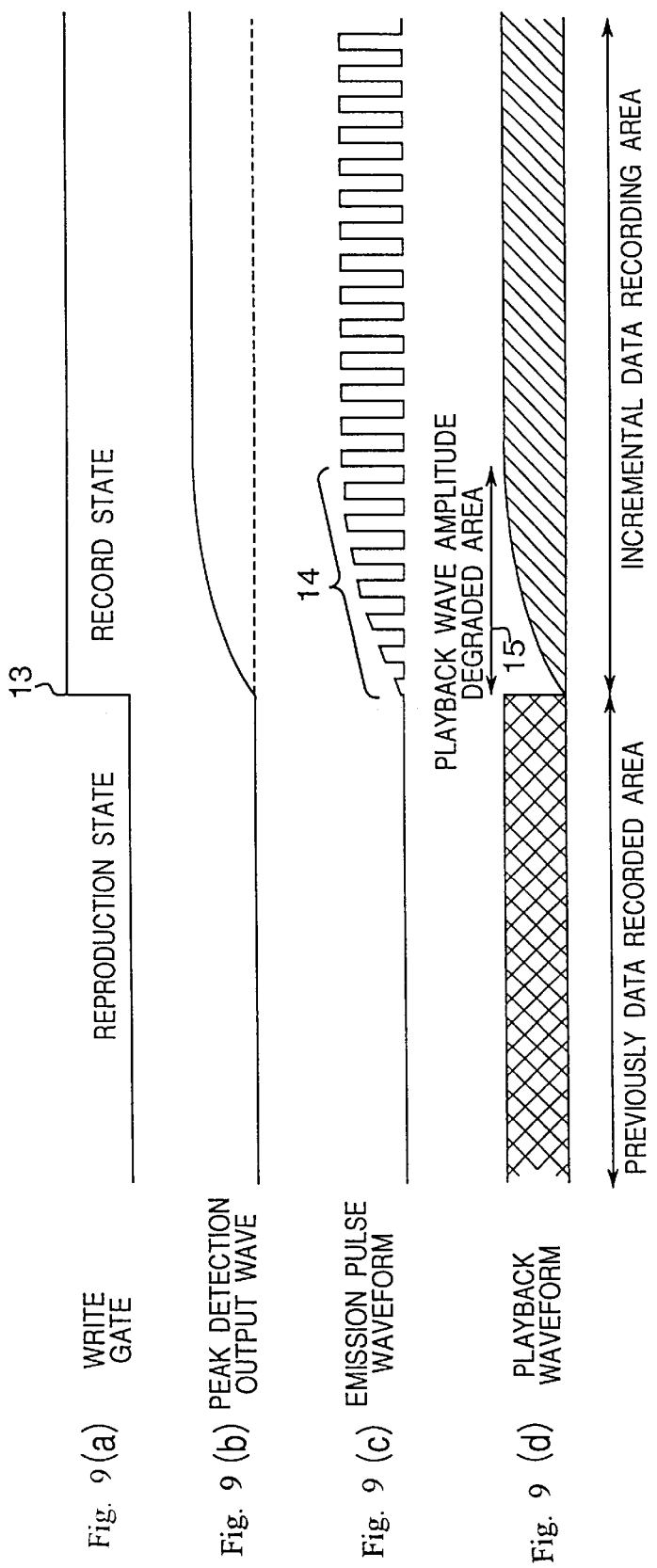

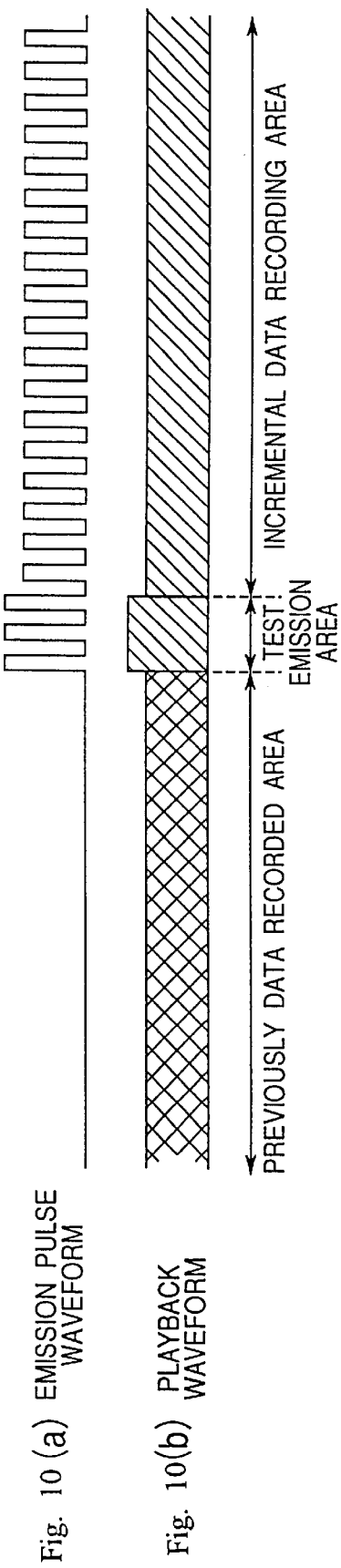

SEMICONDUCTOR LASER CONTROL METHOD AND SEMICONDUCTOR LASER CONTROL DEVICE

BACKGROUND OF THE INVENTION

1. Field of the Invention

The present invention relates to a method and a device for controlling the recording power of a semiconductor laser emitted to record marks onto an optical disc according to a data signal.

2. Description of Related Art

FIG. 8 shows the configuration of a semiconductor laser control device according to the prior art.

Light emitted by the semiconductor laser 1 is sensed by a photodetector 2 for monitoring the emission level, converted to a photoelectric current, and then converted to a voltage by a current-voltage convertor 3.

The sample-hold circuit 5 is set to a sample state by a command from write gate 8 during playback. Playback power current controller 6 compares the read power setting 7 with the detected output in the sample state and outputs the result in a feedback control loop adjusting light output from the semiconductor laser 1 to the read power setting 7.

During recording, the write gate 8 sets the sample-hold circuit 5 to the hold state, and the peak switch 10 switches between a peak value and the held read power setting to current drive the semiconductor laser 1.

The pulse beam emitted from the semiconductor laser 1 is sensed by the photodetector 2, voltage-current converted, and the envelope of the output wave peaks is detected by peak detector 4. Peak current controller 11 compares the output from peak detector 4 with peak power setting 12 and outputs to the peak switch 10 in a feedback control loop adjusting the peak value of the pulse beam from the semiconductor laser 1 to the peak power setting.

The signals from major parts of the prior art semiconductor laser control circuit are described next with reference to FIGS. 9(a)–9(d).

FIG. 9(a) shows the output from write gate 8, which goes from a playback level to a record level at time 13. FIG. 9(b) shows the output from peak detector 4, that is, detecting the peak envelope of the pulse wave sensed in the record state. FIG. 9(c) shows the waveform of the light pulses feedback-controlled by the peak current controller 11. FIG. 9(d) shows the envelope of the playback wave reproduced after this feedback controlled light pulse train is recorded to a track of the optical disc.

The optical disc referred to here is an optical disc such as DVD-R or DVD-RW media, that is, media that can preferably be recorded in multiple sessions with the signals written continuously to the recorded tracks in the same way that signals are recorded to DVD-ROM media. More specifically, the start of recording to an incremental data recording area and the end of the previously recorded data recording area are preferably recorded so that the envelope of the playback signal is continuous. The present invention is therefore applicable to optical disc media such as DVD-R and DVD-RW, and is not applicable to DVD-RAM media.

A problem with the configuration described above is that due to feedback control response, there is a response time delay as shown at bracket 14 in FIG. 9(c) until the peak of the emitted waveform rises to the peak power setting. When the optical disc is recorded with an emission wave as shown at bracket 14 in FIG. 9(c), the amplitude of the reproduced playback wave is degraded according to the response of the emitted waveform as shown in FIG. 9(d).

A problem with the configuration of a prior art semiconductor laser control device as described above, therefore, is that the amplitude of the playback signal at the beginning of a data recording area appended to the disc deteriorates, and continuity of the playback signal amplitude is thus degraded when incrementally writing to DVD-R or DVD-RW optical disc media.

The present invention is directed to a solution for this problem, and an object of the invention is to provide a method and device for controlling a semiconductor laser in order to prevent playback signal deterioration when incrementally writing to DVD-R or DVD-RW optical disc media by quickly controlling and setting recording pulse power to a desirable recording power level.

SUMMARY OF THE INVENTION

To achieve this object, a method according to the present invention for controlling the optical power of light pulses obtained by modulating a semiconductor laser to at least two optical power levels according to a data signal for recording a mark area to an optical disc according to the data signal modulates light pulses with a test signal in a test emission area provided immediately before the data signal recording area for recording a data signal to an optical disc as light pulses modulated according to the data signal, obtains the difference between a reference level equivalent to a target pulse power level and a photodetection signal obtained by sensing and converting the light pulses to an electrical photodetection signal, and applies feed-forward control so that the difference converges to a specified value and current flowing to the semiconductor laser is controlled to a value equivalent to a target power level. Next, it senses the light pulses modulated according to the data signal in the data signal recording area, converts the sensed light pulses to an electrical photodetection signal, obtains a difference between a reference level equivalent to a target pulse power level and sample values obtained by sequentially sampling the photodetection signal at a specific sampling period, and applies feedback control so that the difference converges to a specified value and current flowing to the semiconductor laser is controlled to a value equivalent to a target power level.

The test emission area and data signal recording area are preferably provided in the area traced within one revolution of the optical disc by the optical head from the time at which the optical disc recording operation starts.

Further preferably, the test emissions in the test emission area include pulse emissions and continuous emissions at a constant level.

Yet further preferably, the test emissions in the test emission area include at least two of the following: pulse emissions modulated between the peak and bottom levels of recording pulses emitted at recording marks in the data signal recording area, constant emission at the pulse bottom level, and constant emission at the space level emitted at recording symbol spaces.

Yet further preferably, recording pulses in the recording mark area of the data signal recording area include a start pulse and plural multipulse trains. Feedback control controlling current flowing to the semiconductor laser to a value equivalent to a target power level is achieved by sequentially sampling at a specific sampling interval and step-by-step comparing with a reference level equivalent to a light pulse target power level only the average of the plural multipulse trains, or the average and bottom level of the multipulse trains in the photodetection signal obtained by sensing and converting to an electrical signal the recording pulses in the recording mark period, and the space level of the photodetection signal obtained by sensing and converting to an electrical signal the recording pulses in the recording symbol space part.

Yet further preferably, the data signal for recording to the optical disc is temporarily stored to buffer memory in the test emission area from the timing at which the optical disc recording operation starts to the beginning of the data signal recording area.

A further method according to the present invention for controlling the optical power of light pulses obtained by modulating a semiconductor laser to at least two optical power levels according to a data signal for recording a mark area to an optical disc according to the data signal modulates light pulses with a first test signal in a first test emission area provided immediately before the data signal recording area for recording a data signal to an optical disc as light pulses modulated according to the data signal, obtains a difference between a reference level equivalent to a target pulse power level and a photodetection signal obtained by sensing and converting these light pulses to an electrical photodetection signal, and applies feed-forward control so that the difference converges to a specified value and current flowing to the semiconductor laser is controlled to a value equivalent to a target power level. Next, it modulates light pulses with a second test signal in a second test emission area immediately following the first test emission area, senses and converts these light pulses to an electrical photodetection signal, obtains a difference between a reference level equivalent to a target pulse power level and sample values obtained by sequentially sampling the photodetection signal at a specific sampling period, and applies feedback control so that the difference converges to a specific value and current flowing to the semiconductor laser is controlled to a value equivalent to a target power level. Next, it senses the light pulses modulated according to the data signal in the data signal recording area, converts the sensed light pulses to an electrical photodetection signal, obtains a difference between a reference level equivalent to a target pulse power level and sample values obtained by sequentially sampling the photodetection signal at a specific sampling period, and applies feedback control so that the difference converges to a specified value and current flowing to the semiconductor laser is controlled to a value equivalent to a target power level.

Preferably, the first and second test emission areas are provided in the area traced within one revolution of the optical disc by the optical head from the time at which the optical disc recording operation starts, and the data signal recording area is provided in the area traced in a second revolution.

Yet further preferably, the test emissions in the first and second test emission areas include pulse emissions or continuous emissions at a constant level.

Yet further preferably, the first test emissions in the first test emission area include pulse emissions modulated between the peak and bottom levels of recording pulses emitted at recording marks in the data signal recording area, constant emissions at the pulse bottom level, and constant emissions at the space level emitted at recording symbol spaces.

Yet further preferably, the second test signal consists of recording pulse emissions of random two-value data converted to a specific modulation sign at plural levels required for recording mark formation.

Yet further preferably, recording pulses in the recording mark area of the data signal recording area include a start pulse and plural multipulse trains. Feedback control controls current flowing to the semiconductor laser to a value equivalent to a target power level by sequentially sampling and step-by-step comparing with a reference level equivalent to a light pulse target power level the average and bottom level of the plural multipulse trains of the photodetection signal obtained by sensing and converting to an electrical signal the recording pulses in the recording mark period, and the space level of the photodetection signal obtained by sensing and converting to an electrical signal the recording pulses in the recording symbol space part.

Yet further preferably, the data signal for recording to the optical disc is temporarily stored to buffer memory in the first and second test emission areas from the timing at which the optical disc recording operation starts to the beginning of the data signal recording area.

A further method according to the present invention for controlling the optical power of light pulses obtained by modulating a semiconductor laser to at least two optical power levels according to a data signal for recording a mark area to an optical disc according to the data signal emits a semiconductor laser according to a third test signal in a third test emissions area provided before the data signal recording area for recording a data signal to an optical disc as light pulses modulated according to the data signal, senses and converts the test signal to an electrical photodetection signal, sequentially samples the photodetection signal at specific sampling intervals and obtains a difference between the samples and a reference level equivalent to a target pulse power level, and applies feedback control converging the difference to a specific value and controlling current flowing to the semiconductor laser to a value equivalent to a target power level. Next, it modulates light pulses with a fourth test signal in a fourth test emission area provided after the third test emission area, senses and converts the light pulses to an electrical photodetection signal, obtains a difference between the photodetection signal and a reference level equivalent to a target light pulse power level, and applies feed-forward control converging the difference to a specific value and controlling current flowing to the semiconductor laser to a value equivalent to a target power level. Next, it senses and converts light pulses modulated by the data signal to an electrical photodetection signal in the data signal recording area, sequentially samples the photodetection signal at specific sampling intervals, obtains a difference between the samples and a reference level equivalent to a target light pulse power level, and applies feedback control converging the difference to a specific value and controlling current flowing to the semiconductor laser to a value equivalent to a target power level.

Preferably, the third test emission area is provided in the area traced within one revolution of the optical disc by the optical head from the time at which the optical disc recording operation starts, and the fourth test emission area and data signal recording area are provided in the area traced in a second revolution.

Yet further preferably, test emissions in the third test emission area are continuous emissions at a constant level.

Yet further preferably, test emissions in the third test emission area are continuous emissions at the bottom level of recording pulses emitted in the recording mark area of the data signal recording area or continuous emissions at the space level emitted in the recording symbol space part of the data signal recording area.

Yet further preferably, test emissions in the fourth test emission area are pulse emissions modulated to a level between the peak and bottom levels of recording pulses emitted in the recording mark area of the data signal recording area.

Yet further preferably, recording pulses in the recording mark area of the data signal recording area include a start pulse and plural multipulse trains. Feedback control controls current flowing to the semiconductor laser to a value equivalent to a target power level by sequentially sampling and step-by-step comparing with a reference level equivalent to a light pulse target power level the average of the plural multipulse trains of the photodetection signal obtained by sensing and converting to an electrical signal the recording pulses in the recording mark period, and the space level of the photodetection signal obtained by sensing and converting to an electrical signal the recording pulses in the recording symbol space part.

Yet further preferably, the data signal for recording to the optical disc is temporarily stored to buffer memory in the third and fourth test emission areas from the timing at which the optical disc recording operation starts to the beginning of the data signal recording area.

A control apparatus according to the present invention for controlling the optical power of light pulses obtained by modulating a semiconductor laser to at least two optical power levels according to a data signal for recording a mark area to an optical disc according to the data signal has means for modulating light pulses with a test signal in a test emission area provided immediately before the data signal recording area for recording a data signal to an optical disc as light pulses modulated according to the data signal, and obtaining a difference between a reference level equivalent to a target pulse power level and a photodetection signal obtained by sensing and converting the light pulses to an electrical photodetection signal; a feed-forward control means for controlling current flowing to the semiconductor laser to converge to a value equivalent to a target power level; means for sensing the light pulses modulated according to the data signal in the data signal recording area, converting the sensed light pulses to an electrical photodetection signal, and obtaining a difference between a reference level equivalent to a target pulse power level and sample values obtained by sequentially sampling the photodetection signal at a specific sampling period; and a feedback control means for controlling current flowing to the semiconductor laser to a value equivalent to a target power level.

A further control apparatus according to the present invention for controlling the optical power of light pulses obtained by modulating a semiconductor laser to at least two optical power levels according to a data signal for recording a mark area to an optical disc according to the data signal has means for modulating light pulses with a first test signal in a first test emission area provided immediately before the data signal recording area for recording a data signal to an optical disc as light pulses modulated according to the data signal, and obtaining a difference between a reference level equivalent to a target pulse power level and a photodetection signal obtained by sensing and converting these light pulses to an electrical photodetection signal; a feed-forward control means for controlling current flowing to the semiconductor laser to a value equivalent to a target power level; means for modulating light pulses with a second test signal in a second test emission area immediately following the first test emission area, sensing and converting these light pulses to an electrical photodetection signal, and obtaining a difference between a reference level equivalent to a target pulse power level and sample values obtained by sequentially sampling the photodetection signal at a specific sampling period; a feedback control means for controlling current flowing to the semiconductor laser to a value equivalent to a target power level; means for sensing the light pulses modulated according to the data signal in the data signal recording area, converting the sensed light pulses to an electrical photodetection signal, and obtaining a difference between a reference level equivalent to a target pulse power level and sample values obtained by sequentially sampling the photodetection signal at a specific sampling period; and a feedback control means for controlling current flowing to the semiconductor laser to a value equivalent to a target power level.

A yet further control apparatus according to the present invention for controlling the optical power of light pulses obtained by modulating a semiconductor laser to at least two optical power levels according to a data signal for recording a mark area to an optical disc according to the data signal, comprising: means for emitting a semiconductor laser according to a third test signal in a third test emissions area provided before the data signal recording area for recording a data signal to an optical disc as light pulses modulated according to the data signal, sensing and converting the test signal to an electrical photodetection signal, sequentially sampling the photodetection signal at specific sampling intervals and obtaining a difference between the samples and a reference level equivalent to a target pulse power level; feedback control means for controlling current flowing to the semiconductor laser to a value equivalent to a target power level; means for modulating light pulses with a fourth test signal in a fourth test emission area provided after the third test emission area, sensing and converting the light pulses to an electrical photodetection signal, and obtaining a difference between the photodetection signal and a reference level equivalent to a target light pulse power level; a feed-forward control means for controlling current flowing to the semiconductor laser to a value equivalent to a target power level; means for sensing and converting light pulses modulated by the data signal to an electrical photodetection signal in the data signal recording area, sequentially sampling the photodetection signal at specific sampling intervals, and obtaining a difference between the samples and a reference level equivalent to a target light pulse power level; and a feedback control means for controlling current flowing to the semiconductor laser to a value equivalent to a target power level.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 9(a)–9(d) are waveform diagrams of signals from major parts of the prior art semiconductor laser control device shown in FIG. 8; and FIGS. 10(a) and 19(b) are waveform diagrams of signals from major parts of a semiconductor laser control device according to the present invention.

DESCRIPTION OF THE PREFERRED EMBODIMENTS

Figure 1:
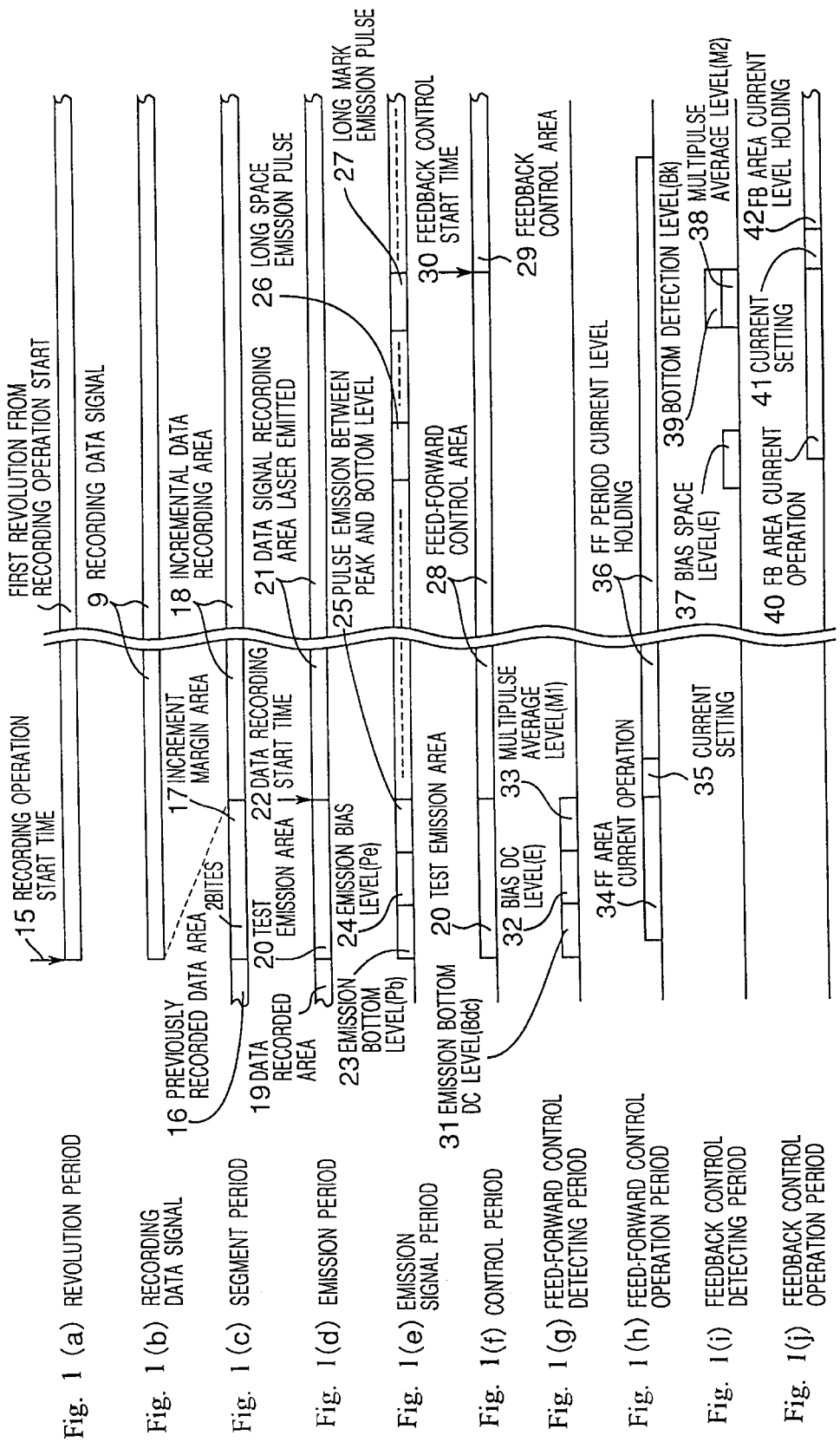
FIGS. 1(a)–1(j) show the operating sequence of a semiconductor laser control method according to a first preferred embodiment of the present invention.

The preferred embodiments of the present invention are described below with reference to the accompanying figures.

Embodiment 1

FIGS. 1(a)–1(j) show the operating sequence of a semiconductor laser control method according to a first preferred embodiment of the present invention. More specifically, FIGS. 1(a)–1(j) show the chronological order of semiconductor laser control operations when incrementally writing to an optical disc such as DVD-R or DVD-RW media.

FIG. 1(a) shows a track segment on the optical disc where incremental writing starts at time 15 and the control steps shown in FIGS. 1(b) to (j) are completed in one revolution of the disc.

FIG. 1(b) represents the user data signal to be recorded to the optical disc. This user data signal is output from a host computer (not shown in the figure) simultaneously to time 15 at which the recording operation starts (referred to below as recording start time 15).

FIG. 1(c) shows the data recording areas on the optical disc. The area preceding recording start time 15 is previously recorded data area 16. The area following recording start time 15 is divided into increment margin area 17 and incremental data recording area 18.

The increment margin area 17 is an approximately 2 byte area provided in the disc format for settling semiconductor laser power for the incremental writing operation. The semiconductor laser recording power must settle within the increment margin area 17 to a level assuring sufficient amplitude in the playback signal.

FIG. 1(d) shows the semiconductor laser emission areas on the optical disc. Recorded data area 19 is located before recording start time 15. After recording start time 15, the laser emission areas include test emission area 20 in increment margin area 17 for feed-forward control of the semiconductor laser, and data signal recording area 21 where the laser is emitted to record the user data signal.

As shown in FIG. 1(b), the recording data signal 9 (that is, the data signal to be incrementally recorded, referred to below as the "user data signal") is output from the host computer at recording start time 15, but the time at which recording the user data signal 9 to the optical disc actually starts is data recording start time 22.

It is therefore necessary to provide FIFO or another type of buffer memory to temporarily store the user data signal 9 through the test emission area 20 because of this delay from the recording start time 15 to the data recording start time 22.

FIG. 1(e) shows the actual emission signal areas of the semiconductor laser 1 on optical disc. Test emissions are made in the test emission area 20 using three different signal patterns on DVD-RW media and two signal patterns on DVD-R media.

More specifically, for DVD-RW media test emissions are made using the three pulse levels defined by the DVD-RW recording strategy: a constant bottom level (Pb) 23 for recorded pulses, a constant bias level (Pe) 24 for recording symbol spaces, and a pulse level 25 between the peak and bottom levels of the recorded pulses for recording symbol marks.

For DVD-R media, test emissions are made using the two pulse levels defined by the DVD-R recording strategy: constant emission at the bottom emission level (Pb) 23 for recording pulses, and pulse level 25 between the peak and bottom levels of the recording pulses for recording symbol marks. The bias level for spaces is the same as the bottom emission level (Pb) 23 in DVD-R media.

The emission signals in the data signal recording area 21 are described next. The user data signal 9 recorded in area 21 is a substantially random signal because the signal is scrambled before recording. Pulse 27 for a relatively long mark (10T or longer, for example) and pulse 26 for a relatively long space (10T or longer, for example) in the pulse signal recorded to the optical disc after 8–16 modulation coding are therefore selected and used as the detection signal for feedback control as further described below.

Pulses for relatively long marks and spaces are selected for use as the detection signal because they make it relatively easy to achieve the frequency characteristic required by the signal processing circuit for bottom envelope detection and multipulse average detection as further described below.

It should be noted, however, that the pulses for relatively long marks and spaces are substantially random in the data signal recording area 21, which means that the pulse positions can only be determined from probability and the probability is also low. For example, the probability of a 10T or longer mark or space is approximately 2%.

FIG. 1(f) represents the semiconductor laser 1 control areas on the optical disc. Feed-forward control is applied in the feed-forward control area 28 to compare the pulse signal detected in the test emission area 20 with a reference level equivalent to the target power level of the laser pulse and control the current flowing to the semiconductor laser to the target power level.

Continuous feedback control is applied in feedback control area 29 so that the current flowing to the semiconductor laser is controlled to the target power level by a step-by-step comparison of each long space pulse 26 and long mark pulse 27 with a reference level equivalent to the desired target power level of the laser pulse each time a long space pulse 26 and a long mark pulse 27 pair is detected.

The feedback control start time 30 is determined after the data hold operation shown as step 76 in FIG. 5 (described below) when at least one long space pulse 26 and long mark pulse 27 pair is detected. It is also possible to detect plural pairs, rather than only one, obtain the average, and then determine the feedback control start time 30. It will also be noted that the feedback control start time 30 can also only be determined based on probability according to the content of the user data signal 9 because, as noted above, the pulse positions of relatively long marks and spaces can only be determined by probability and the probability is low.

FIG. 1(*g*) shows the detection periods of the optical disc during feed-forward control. The detection signal is described for the pulse signal periods shown in (*e*).

Referring first to DVD-RW media the bottom dc level (Bdc) 31 is detected in the constant pulse bottom level (Pb) 23 period. The bias dc level (E) 32 is detected in the constant bias level (Pe) 24 period. The average (M1) 33 of plural multipulse trains is detected in the period where pulse level 25 is between the peak and bottom levels.

Only the bottom dc level (Bdc) 31 and average (M1) 33 are detected with DVD-R media because there is no constant bias level (Pe) 24 period.

FIG. 1(*h*) shows the area of the feed-forward control operation on the optical disc.

A feed-forward current operation 34 period is provided in the test emission area 20 for comparing the detected test signal and the reference level equivalent to the laser pulse target power level and controlling current flowing to the semiconductor laser to the target power level. A current setting 35 period for setting the calculated current to the semiconductor laser, and a feed-forward period current holding period 36 for holding the feed-forward controlled current setting to the feedback control start time 30, are also provided.

It is therefore possible to control the semiconductor laser recording power to settle at high speed to a target power level by applying feed-forward control with the signal detected from test emissions before data recording starts, and it is therefore possible to prevent deterioration of the playback signal amplitude where one incremental recording session continues from a previous session.

FIG. 1(*i*) shows the feedback control detection period of the optical disc. This is described using a detection signal for the pulse signal periods shown in (*e*).

Referring first to DVD-RW media, the bias/space level (E) 37 from a recording symbol space is detected in the long space pulse 26 period. In the long mark pulse 27 period, the semiconductor laser pulse power level is detected from the multipulse average (M2) 38 of a recording symbol mark period and the bottom detection level (Bk) 39, which detects the envelope of the bottom levels of the recording marks.

Detecting the bottom level is unnecessary with DVD-R media because the mark bottom level and space power level are the same. That is, the space level (E) 37 is detected in the long space pulse 26 period, and the multipulse average (M2) 38 is detected in the recording mark period.

FIG. 1(*j*) shows the control periods for feedback control on the optical disc.

A feedback control period current operation 40 is provided for a step-by-step operation comparing a detected test signal with a reference level equivalent to the target power level of the laser pulse each time a long space pulse 26 and long mark pulse 27 pair of pulse signals is detected by detection signals 37 to 39 in order to control the current flowing to the semiconductor laser to the target power level. A current setting 41 period for setting the current determined by the feedback control operation to the semiconductor laser is provided next. Finally, a feedback current holding period 42 is provided to hold the current set by the feedback control operation until the current is reset by the next feedback control operation.

This feedback control sequence (40 to 42) of calculating, setting, and holding the current level supplied to the semiconductor laser each time a pulse signal containing a long space pulse 26 and long mark pulse 27 pair is detected thus continues as long as the recording operation continues.

By thus changing to continuous feedback control after first using feed-forward control, laser power can be continuously controlled stably and for an extended period to a target power level even when the recording operation continues for a long period and the current level set to the target power level varies due to the temperature characteristics of the semiconductor laser.

As described above, the semiconductor laser control method of this first embodiment first applies feed-forward control using a test emission, and then changes to feedback control. As a result, the recording power of the semiconductor laser can be quickly settled to a target power level immediately after data recording starts. Deterioration of the playback signal amplitude where one incremental recording session continues to a next incremental recording session can therefore be prevented. Furthermore, even when the recording operation continues for a long time and the current supply that must be set to the target power level changes due to the temperature characteristics of the semiconductor laser, the semiconductor laser can be stably controlled over an extended period of time to the target power level.

Figure 2:
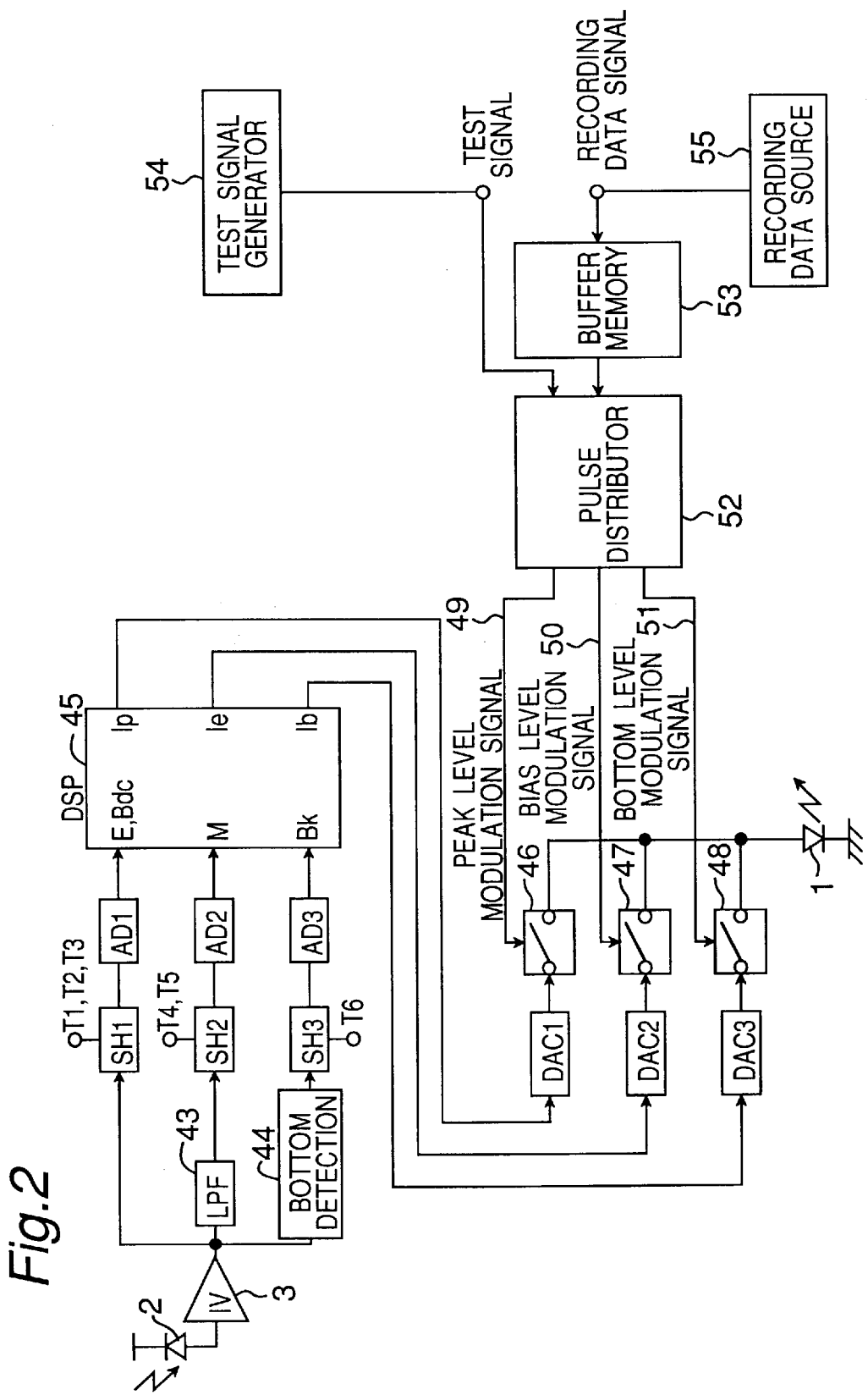
FIG. 2 shows the configuration of a semiconductor laser control device according to a first preferred embodiment of the present invention.

FIG. 2 shows the configuration of a semiconductor laser control device according to a first embodiment of the present invention.

The pulse emitted by the semiconductor laser 1 is sensed by photodetector 2, which monitors the pulse level, and converted to a voltage by current-voltage convertor 3.

The converted pulse wave is then input to sample-hold circuit SH1. At the timing of sampling pulses T1, T2, and T3 determined according to the pulse wave, sample-hold circuit SH1 samples and holds bottom dc level (Bdc) 31 and bias dc level (E) 32 in the test emission area 20, and bias/space level (E) 37 for long spaces in the data signal recording area 21.

The converted pulse wave is also input to a low-pass filter 43. The low-pass filter 43 is set to a cutoff frequency that smoothens the multipulse part so that the average of a multipulse part including peak-bottom pulse level 25 and long mark pulse 27.

Low-pass filter 43 output is input to sample-hold circuit SH2. At the timing of sampling pulses T4 and T5, determined according to the pulse wave, the sample-hold circuit SH2 samples and holds multipulse average (M1) 33 in test emission area 20 and long mark multipulse average (M2) 38 in data signal recording area 21.

The converted pulse wave is also input to bottom detection circuit 44. The bottom detection circuit 44 is set to a time constant enabling the bottom envelope of the recording marks to be detected. The bottom detection circuit 44 outputs to sample-hold circuit SH3. At the timing of sampling pulse T6, which is determined according to the pulse wave, the sample-hold circuit SH3 samples and holds the long mark bottom detection level (Bk) 39 in data signal recording area 21.

Sample-hold circuits SH1, SH2, SH3 output to AD converters AD1, AD2, AD3, respectively, which convert the input to digital data. The digital data is then input to digital signal processor (DSP) 45 as the digital bias/space level (E) or bottom dc level (Bdc), multipulse average (M), or bottom detection level (Bk).

Operation of the DSP 45 is described next. Starting in the test emission area 20, the DSP 45 first applies feed-forward control comparing the detected three or two test signals with the reference level equivalent to the target power level of the laser pulse, and controls the peak current Ip, bias current Ie, and bottom current Ib flowing to the semiconductor laser to the desired target power levels. The current levels set at this time are held until the feedback control start time 30.

In the data signal recording area 21 the DSP 45 compares the detected test signals with the reference level equivalent to the target power level of the laser pulse each time a pulse signal containing a long space pulse 26 and long mark pulse 27 pair is detected for step-by-step feedback control setting the peak current Ip, bias current Ie, and bottom current Ib flowing to the semiconductor laser 1 to the target power level.

The current levels set in this feedback control operation are held until the current levels are reset by a next feedback control operation. Feedback control thus repeats continuously each time a pulse signal containing a long space pulse 26 and long mark pulse 27 pair is detected for as long as the recording operation continues.

Figure 4:
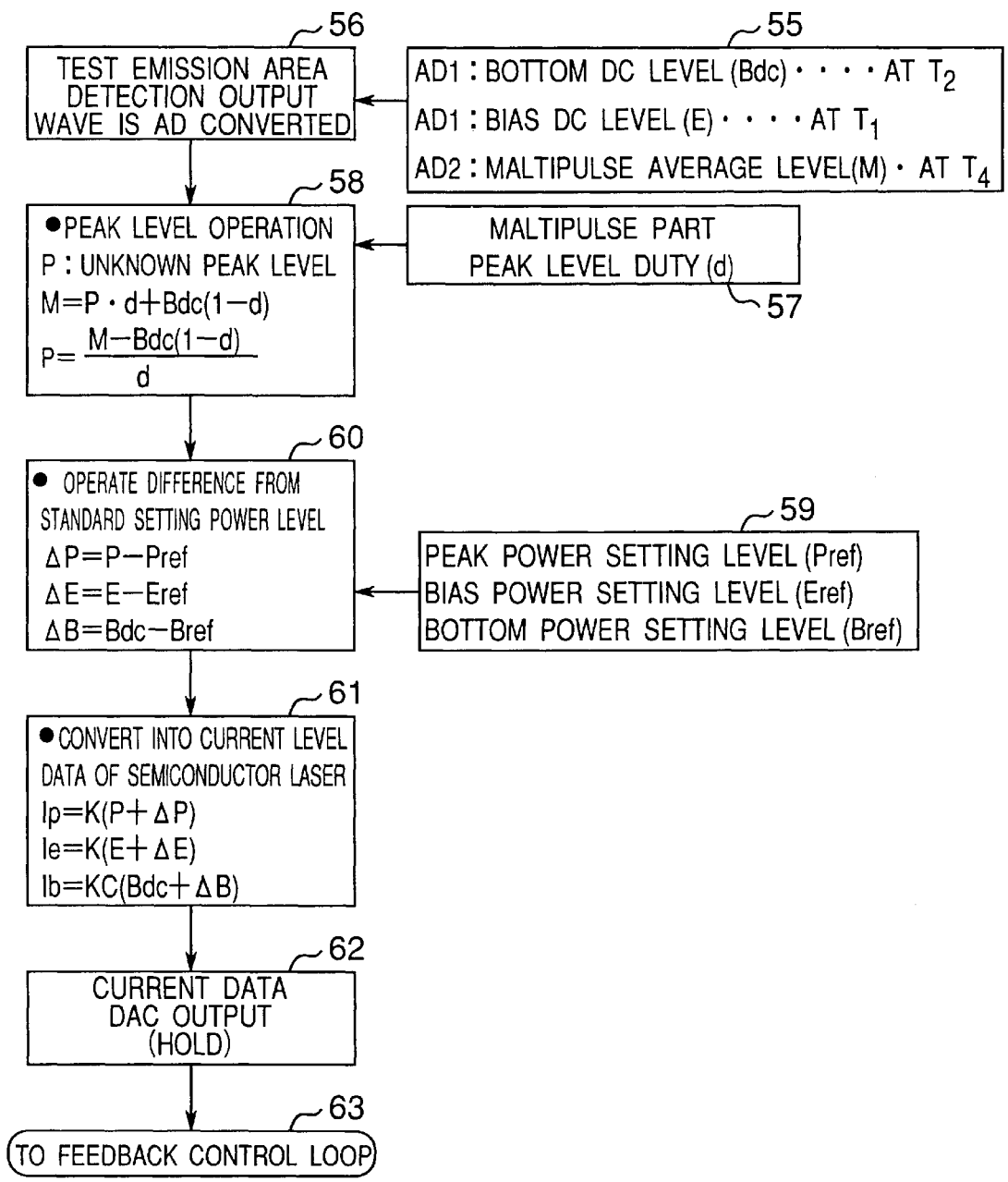
FIG. 4 is a flow chart of the calculations for feedback control by a semiconductor laser control device according to the present invention.

The operations performed by the DSP 45 are described in detail next with reference to FIG. 4 and FIG. 5.

The peak current operation data output from the DSP 45 is input to D/A converter DAC1, and converted to an analog current value. The analog signal is then input to peak level switch 46, switched to a pulse current according to the peak modulation signal 49, and output to current drive the semiconductor laser 1.

The bias current operation data output from DSP 45 is input to D/A converter DAC2 and converted to an analog current value. The analog signal is then input to bias level switch 47, switched to a pulse current according to the bias modulation signal 50, and similarly output to current drive the semiconductor laser 1.

The bottom current operation data output from DSP 45 is input to D/A converter DAC3 and converted to an analog current value. The analog signal is then input to bottom level switch 48, switched to a pulse current according to the bottom modulation signal 51, and similarly output to current drive the semiconductor laser 1.

The pulse distributor 52 distributes the 8–16 modulated recording signal to the peak modulation signal 49, bias modulation signal 50, and bottom modulation signal 51 for input to the peak level switch 46, bias level switch 47, and bottom level switch 48, respectively, to switch the semiconductor laser 1.

The buffer memory 53 is a FIFO memory, for example, for temporarily storing the user data signal 9 in test emission area 20 to produce a time delay between the recording start time 15 and data recording start time 22 as shown in FIG. 1.

Figure 3:
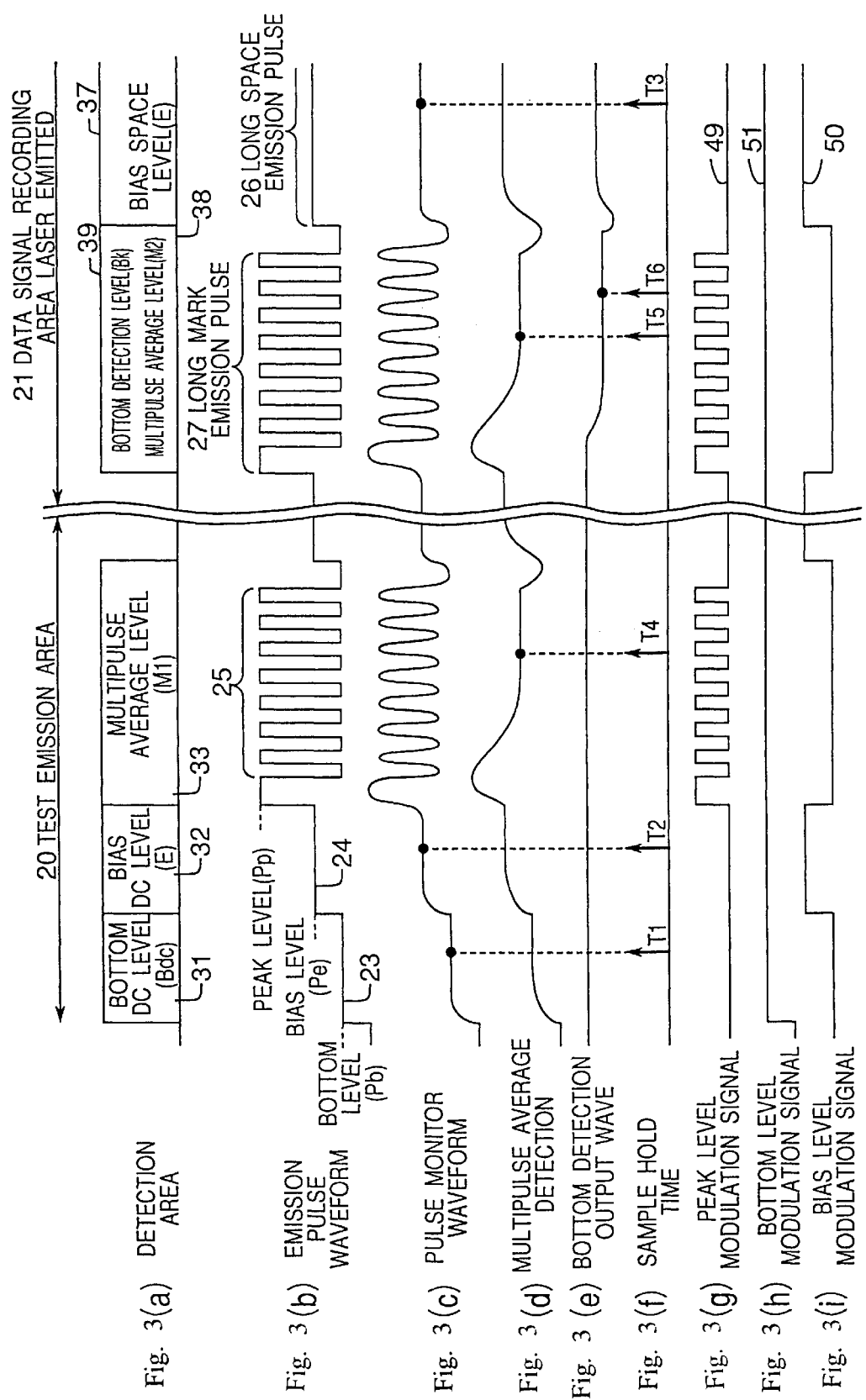
FIGS. 3(a)–3(i) are waveform diagrams showing signals from major parts of the semiconductor laser control device shown in FIG. 2.

The test signal generated by test signal generator 54 in the test emission area 20 is input to pulse distributor 52. The test signal includes the constant pulse bottom level (Pb) 23, constant bias level (Pe) 24, and peak-bottom pulse level 25 shown in FIGS. 3(a)–3(i). Based on these three signals, that is, constant pulse bottom level (Pb) 23, constant bias level (Pe) 24, and peak-bottom pulse level 25, the pulse distributor 52 generates bottom modulation signal 51 (FIG. 3(h)), bias modulation signal 50 (FIG. 3(i)), and peak modulation signal 49 (FIG. 3(g)) in the test emission area 20, outputs these signals respectively to switches 48, 47, and 46, and controls the on/off timing of these switches 48, 47, 46.

The operation of the configuration shown in FIG. 2 is described in further detail next with reference to the waveforms shown in FIGS. 3(a)–3(i).

FIG. 3(a) shows the parts of the detection signal in test emission area 20 and data signal recording area 21. FIG. 3(b) shows the pulse wave detected in test emission area 20 and data signal recording area 21.

The correlation between the pulse wave (b) and detection signal (a) is described first.

With DVD-RW media the bottom dc level (Bdc) 31 is detected in the constant pulse bottom level (Pb) 23 part of the detection signal; the bias dc level (E) 32 is detected in the constant bias level (Pe) 24 part; and the average (M1) 33 of plural multipulse trains is detected in the peak-bottom pulse level 25 part of the detection signal. The detected bottom dc level (Bdc) 31, bias dc level (E) 32, and multipulse average (M1) 33 are then AID converted and input to the DSP 45.

With DVD-R media there is no constant bias level (Pe) 24 part, and only the bottom dc level (Bdc) 31 and multipulse average (M1) 33 are therefore detected. The detected bottom dc level (Bdc) 31 and multipulse average (M1) 33 are therefore A/D converted and input to the DSP 45.

The correlation between the pulse wave (b) and detection signal (a) in the data signal recording area 21 is described next.

With DVD-RW media the bias/space level (E) 37 for recording symbol spaces is detected in the long space pulse 26 part. In the long mark pulse 27 part the multipulse average (M2) 38 of recording marks and the bottom detection level (Bk) 39 for detecting the bottom envelope of the recording marks are used to detect the pulse power level of the semiconductor laser.

With DVD-R media the recording mark bottom level and the space power level are equal. It is therefore not necessary to detect the bottom level. More specifically, the bias/space level (E) 37 is detected in the long space pulse 26 part and the multipulse average (M2) 38 of the recording marks is detected in the long mark pulse 27 part.

Why laser power is detected from the wave pulses of the long space pulse 26 and long mark pulse 27 parts of the detection signal in the data signal recording area 21 is described next.

The user data signal 9 is scrambled before being recorded and is therefore a substantially random signal in the data signal recording area 21. Pulse 27 for a relatively long mark (10T or longer, for example) and pulse 26 for a relatively long space (10T or longer, for example) in the pulse signal recorded to the optical disc after 8–16 modulation coding are therefore selected and used as the detection signal for feedback control.

Pulses for relatively long marks and spaces are selected for use as the detection signal because they make it relatively easy to achieve the frequency characteristic required for the bottom detection signal processing circuit and multipulse average detection as further described below.

It should be noted, however, that the pulse positions for relatively long marks and spaces are substantially random in the data signal recording area 21, which means that the pulse positions can only be determined from probability and the probability is also low. For example, the probability of a 10T or longer mark or space is approximately 2%.

This makes it difficult to quickly set the laser to the target recording power using feedback control only at the data recording start time 22. Feed-forward control is therefore used immediately after the data recording start time 22 and control is switched to feedback control as soon as long mark and long space pulses are detected.

FIG. 3(c) shows the pulse monitor wave after the pulse is sensed by the photodetector 2 and converted to a pulse voltage by current-voltage convertor 3. Note that due to the response of the photodetector 2, the frequency characteristic is degraded somewhat from the pulse wave shown in FIG. 3(b).

FIG. 3(d) shows the output wave of the low-pass filter 43. The low-pass filter 43 is set to a cutoff frequency that smoothens the multipulse part so that the average of a multipulse part including peak-bottom pulse level 25 and long mark pulse 27.

FIG. 3(e) is the output wave of the bottom detection circuit 44. The bottom detection circuit 44 is set to a time constant enabling the bottom envelope of the recording marks to be detected.

FIG. 3(f) shows the timing T1 to T6 controlling the sampling operations of the sample-hold circuits SH1, SH2, SH3.

The detection timing in the test emission area 20 is described first. The bottom dc level (Bdc) 31 is detected by sample-hold circuit SH1, and is detected by sampling the waveform shown in FIG. 3(c) at sampling time T1. The bias dc level (E) 32 is also detected by sample-hold circuit SH1, and is detected by sampling the waveform shown in FIG. 3(c) at sampling time T2. The multipulse average (M1) 33 is detected by sample-hold circuit SH2 by sampling the multipulse average detection waveform in FIG. 3(d) at sampling time T4.

The detection timing in data signal recording area 21 is described next. The multipulse average (M2) 38 for the long mark pulse 27 part is detected by sample-hold circuit SH2 by sampling the multipulse average detection waveform in FIG. 3(d) at sampling time T5. The bottom detection level (Bk) 39 of long mark pulse 27 is detected by sample-hold circuit SH3 by sampling the bottom detection output wave in FIG. 3(e) at sampling time T6.

The bias/space level (E) 37 for long space pulse 26 is detected by sample-hold circuit SH1 by sampling the detection wave in FIG. 3(c) at sampling time T3.

FIG. 3(g) shows the peak modulation signal 49, which is applied to the peak level switch 46 and goes high only at the pulse drive timing at which the semiconductor laser 1 is driven at the peak power level. FIG. 3(h) shows the bottom modulation signal 51, which drives the bottom level switch 48 and goes high only at the timing at which the laser pulse is driven at a power level above the bottom level. FIG. 3(i) shows the bias modulation signal 50, which drives the bias level switch 47 and goes high only at the timing at which the laser pulse is driven at the bias power level.

FIG. 3(b) shows the output pulse wave of the semiconductor laser 1 driven by these three modulation signals, and shows the pulse wave modulated according to the three levels shown in FIGS. 3(g), (h), and (i).

As will be known from the above description, a semiconductor laser control device according to the first embodiment of the invention detects the bottom dc level, bias dc level, and multipulse average in the test emission area and applies feed-forward control to quickly settle and control the recording power of the semiconductor laser to the target power level immediately after data recording starts, and then in the data recording signal pulse period continuously applies feedback control to detect the multipulse average and bottom level at each detected long mark pulse and detect the bias/space level (E) at each long space pulse. It is therefore possible to maintain laser power at a stable target recording power level for an extended period even when recording continues for a long time and the current set to the target power level varies due to the temperature characteristics of the semiconductor laser.

Operation of the DSP 45 during feed-forward control in the test emission area 20 is described next with reference to FIG. 4.

At sampling pulse T2 in FIG. 3(f) bottom dc level (Bdc) 31 is read from A/D converter AD1, bias dc level (E) 32 is read from A/D converter AD1 at sampling pulse T1, and multipulse average (M1) 33 is read from A/D converter AD2 at sampling pulse T4. The bottom dc level (Bdc) 31, bias dc level (E) 32, and multipulse average (M1) 33 are thus input to DSP 45 in step 55 in FIG. 4.

The peak duty (d) of the multipulse part of the pulse train between peak and bottom levels (the peak-bottom pulse level 25 in FIG. 3(b)) in the test emission area 20 is then input (step 57).

The level detected at sampling pulse T4 in FIG. 3(d) is the multipulse average (M) and not a peak (P) level, and the multipulse average (M) must therefore be converted to a peak (P) level. Photodetection output at the multipulse peak (P) level can be calculated from the above input data. That is, if peak level (P) is the unknown, the unknown P can be obtained from the following equation (step 58).

$$M = P \cdot d + Bdc \cdot (1-d)$$

Therefore, $$P = \{M - Bdc \cdot (1-d)\}/d$$

The control targets, that is, peak power setting (Pref), bias power setting (Eref), and bottom power setting (Bref) are input next. Note that these target settings, that is, Pref, Eref, and Bref, are predetermined and stored in the DSP 45.

Peak level (P) from step 58 and bottom dc level (Bdc) and bias dc level (E) obtain from step 55 are then compared with the power settings Pref, Eref, and Bref from step 59, and differences $\Delta P$, $\Delta E$, $\Delta B$ are obtained (step 60).

$$\Delta P = P - Pref$$

$$\Delta E = E - Eref$$

$$\Delta B = B - Bref$$

Differences $\Delta P$, $\Delta E$, $\Delta B$ from step 60 are then added to the peak P, bottom dc level (Bdc), and bias dc level (E) from the monitored pulse wave to obtain the current supply to the semiconductor laser 1 (step 61). Differences $\Delta P$, $\Delta E$, $\Delta B$ are thus controlled to converge to a specific level, such as zero.

More specifically, peak current Ip, bottom current Ib, and bias current Ie are obtained as follows where K is the current conversion coefficient.

$$Ip = K(P + \Delta P)$$

$$Ie = K(E + \Delta E)$$

$$Ib = K(Bdc + \Delta B).$$

The resulting peak current Ip is then applied to D/A converter DAC1, bias current Ie to D/A converter DAC2, and bottom current Ib to D/A converter DAC3 (step 62).

The current values applied to DIA converters DAC1, DAC2, DAC3 are used for feed-forward control. That is, peak level (P), bottom dc level (Bdc), and bias dc level (E) are controlled to converge to the predetermined targets Pref, Bref, and Eref. Feed-forward control continues until at least one long space pulse 26 and long mark pulse 27 pair is detected. Feedback control starts when at least one long space pulse 26 and long mark pulse 27 pair is detected. The current data applied to D/A converters DAC1, DAC2, DAC3 is therefore held until the feedback control start timing, and the feedback control loop (step 63) starts when at least one long space pulse 26 and long mark pulse 27 pair is detected.

Operation of the DSP 45 in the feedback control loop in data signal recording area 21 is described next with reference to FIG. 5.

When feedback control starts, A/D converter AD1 A/D converts the bias/space level (E) 37 detected at a long space pulse in the recorded data signal and inputs the digital value to the DSP 45 (steps 64, 65).

At the long mark pulse in the user data signal 9, A/D converter AD2 and A/D converter AD3 A/D convert the detected multipulse average (M2) 38 and bottom detection level (Bk) 39, respectively, and input the digital values to the DSP 45 (steps 66, 67).

It will be noted that while a long space pulse is A/D converted first here, the above order can be reversed if a long mark pulse appears in the user data signal 9 first.

A bottom detection correction coefficient ($\alpha$) is then input to correct the response characteristic of the bottom detection circuit 44. The bottom detection circuit 44 detects the bottom envelope of the long mark pulse part, but detection efficiency is a value less than 100% due to the frequency characteristic of the detection circuit. This bottom detection correction coefficient ($\alpha$), which is the inverse of the detection efficiency, is therefore used as shown in the following equation to correct the bottom detection level (Bk) for conversion to the actual bottom level (B) of the pulse (steps 68, 69).

$$B = \alpha \cdot Bk$$

The peak duty (d) of the long mark multipulse part (long mark pulse 27 in FIG. 3(b)) is then input (step 70).

Photodetector output for the multipulse peak (P) is then determined from the following equation using the above input data. That is, if peak level (P) is the unknown, the unknown P can be obtained from the following equation (step 71).

$$M = P \cdot + Bdc \cdot (1-d)$$

Therefore, $$P = \{M - Bdc \cdot (1-d)\}/d$$

The same control targets noted above, that is, peak power setting (Pref), bias power setting (Eref), and bottom power setting (Bref) are input next (step 72).

Peak level (P) from step 71, bottom dc level (B) from step 69, and bias/space level (E) from step 65 are then compared with the power settings input in step 72, and differences $\Delta P$, $\Delta E$, $\Delta B$ are obtained (step 73).

$$\Delta P = P - Pref$$

$$\Delta E = E - Eref$$

$$\Delta B = B - Bref$$

Figure 5:
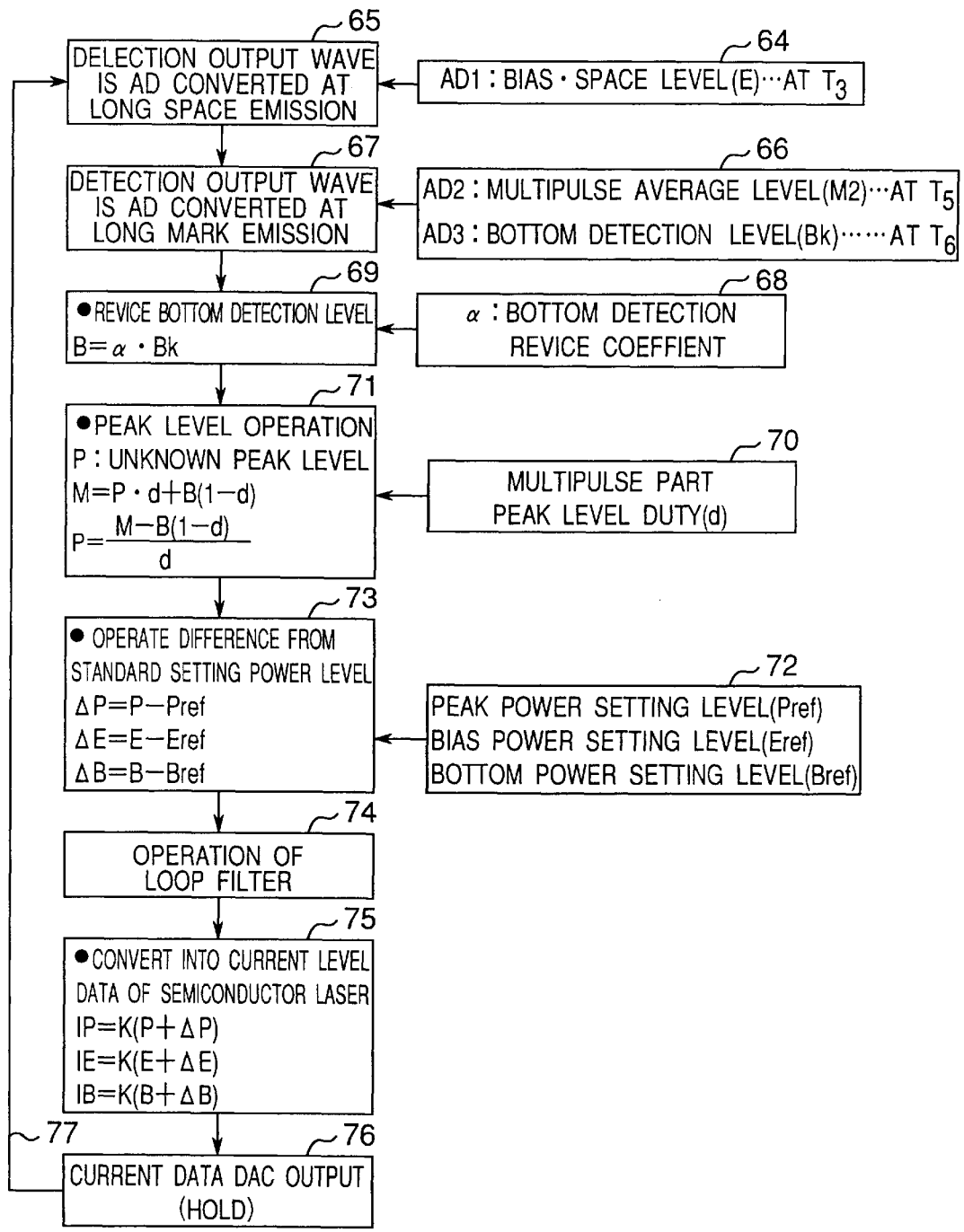
FIG. 5 is a flow chart of the calculations for feedback control by a semiconductor laser control device according to the present invention.

The loop filter operation in step 74 determines the response frequency of the feedback control system described in FIG. 5. The thermal characteristic is the major cause of current-pulse power fluctuation in the semiconductor laser during recording, and feedback control loop response of at most several 100 Hz or less is sufficient. The loop filter operation in step 74 therefore uses a cutoff frequency of several 100 Hz or less.

The current flow to the semiconductor laser 1 is then determined by adding the output of the loop filter operation (step 74) on the differences $\Delta P$, $\Delta E$, $\Delta B$ obtained (step 73) to the currently detected power levels, that is, peak P, bottom B, and bias E.

More specifically, peak current Ip, bottom current Ib, and bias current Ie are obtained as follows using current conversion coefficient K.

$$Ip = K(P + \Delta P)$$

$$Ie = K(E + \Delta E)$$

$$Ib = K(B + \Delta B)$$

The resulting peak current Ip is then applied to D/A converter DAC1, bias current Ie to D/A converter DAC2, and bottom current Ib to DIA converter DAC3 (step 76).

The current values applied to D/A converters DAC1, DAC2, DAC3 are then held until the next current data conversion process (step 75).

When current data output to the D/A converters ends, the feedback control loop returns to the long space pulse detection step 65 (step 77).

As described with reference to FIG. 4 and FIG. 5, the semiconductor laser control method of the first embodiment detects the bottom dc level, bias dc level, and multipulse average in a test emission area for feed-forward control enabling the semiconductor laser recording power to be quickly controlled and settled to a target power level immediately after the start of data recording. This is then followed in the signal data recording pulse period by detecting the multipulse average and bottom envelope at each long mark pulse period, detecting the space level at each long space period, and continuing feedback control as long as recording continues. The semiconductor laser is therefore controlled to maintain the target power levels Pref, Eref, and Bref even when the current supply changes due to the temperature characteristics of the semiconductor laser when recording continues for a long period. The semiconductor laser can therefore be controlled to output at a stable desired recording power level.

Embodiment 2

FIGS. 6(a)–6(j) are is used to describe the configuration and operation of a semiconductor laser control method according to a second preferred embodiment of the invention. More specifically, FIGS. 6(a)–6(g) show the chronological order of semiconductor laser control operations when incrementally writing to rewritable optical disc media such as DVD-RW media.

Figure 6:
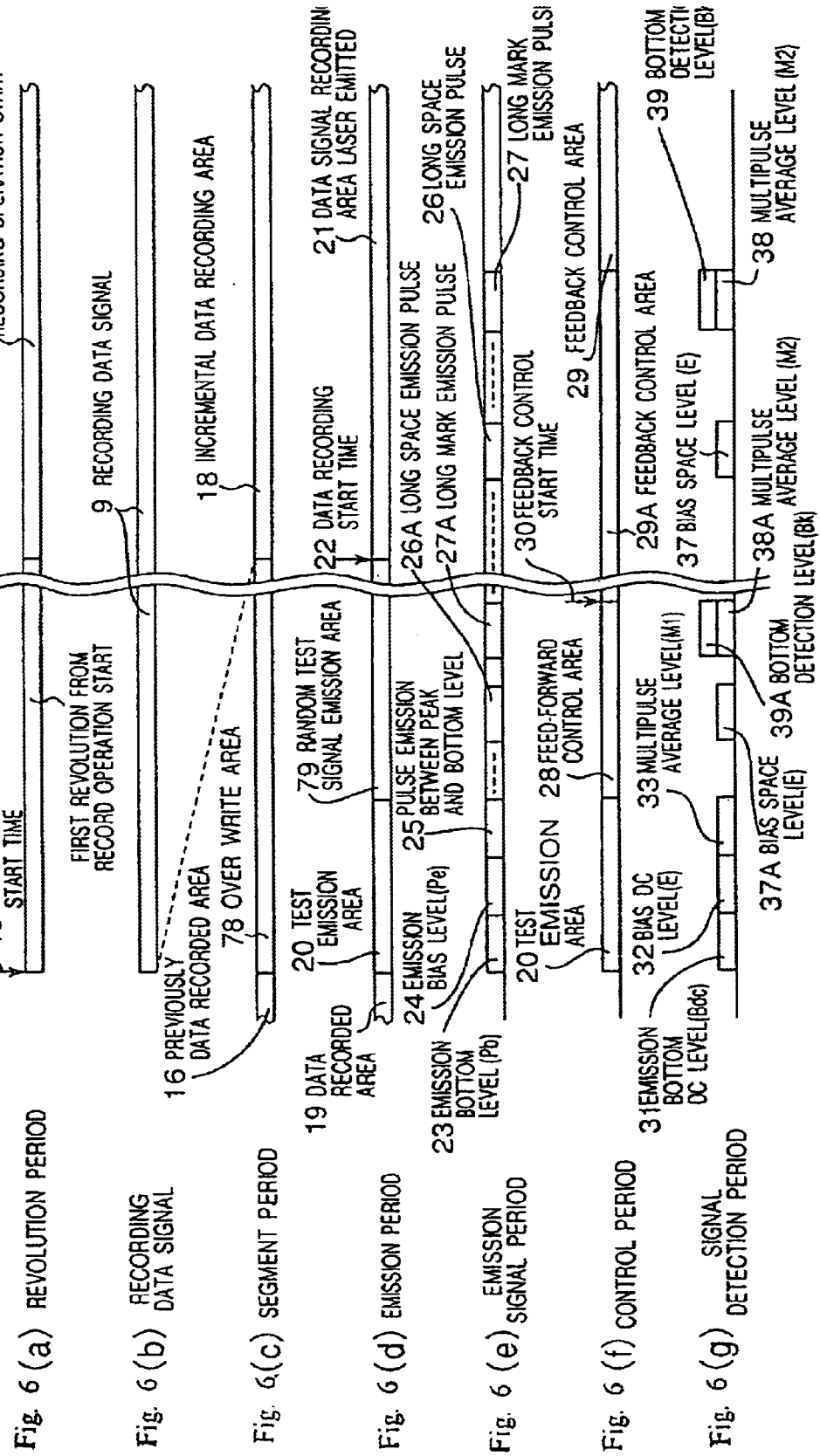
FIGS. 6(a)–6(g) show the operating sequence of a semiconductor laser control method according to a second preferred embodiment of the present invention.

As shown in FIG. 6(a), a single track is segmented into first and second recording start periods. The first recording start period is written from recording start time 15 to data recording start time 22, and is used to record test pulses for controlling the semiconductor laser recording power to a target power level.

The second recording start period starts from data recording start time 22, and is used to record the desired user data signal 9 by jumping back to the same track used for test pulse recording and overwrite the test pulses with the user data signal 9.

FIG. 6(b) shows the user data signal to be recorded to disc. The user data is sent from a host computer (not shown in the figure) at recording start time 15.

FIG. 6(c) shows the data recording areas on the optical disc. The area preceding recording start time 15 is previously recorded data area 16. The area following recording start time 15 to data recording start time 22 is the overwrite area 78. The test pulses recorded during the first recording start period are overwritten in the overwrite area 78 with the desired user data signal 9.

FIG. 6(d) shows the semiconductor laser emission areas on the optical disc. Recorded data area 19 is located before recording start time 15.

The first recording start period from recording start time 15 to data recording start time 22 is divided into the test emission area 20 (first test emission area) for feed-forward control of the semiconductor laser, and random test emission area 79 (second test emission area) for feedback control of the semiconductor laser.

The random test signal emission area 79 can be a single continuous area to data recording start time 22, or can be limited to the pulse length required for feedback control.

The second recording start period following data recording start time 22 comprises data signal recording area 21 where the semiconductor laser is driven to record the user data signal.

As shown in FIG. 6(b), the user data signal 9 is sent from a host computer in the first recording start period at recording start time 15, but actually recording the user data signal 9 to optical disc does not start until the second recording start period at data recording start time 22.

A FIFO or other type of buffer memory is therefore required to temporarily store the user data signal 9 in test emission area 20 and random test emission area 79 because of this delay, equal to approximately one revolution, from recording start time 15 to data recording start time 22.

FIG. 6(e) shows the actual pulse signal periods of the semiconductor laser 1 on optical disc. Pulse emissions in the test emission area 20 are described first.

Rewritable optical discs such as DVD-RW media use the three pulse levels defined by the DVD-RW recording strategy: a constant bottom level (Pb) 23 for recorded pulses, a constant bias level (Pe) 24 for recording symbol spaces, and a pulse level 25 between the peak and bottom levels of the recorded pulses for recording symbol marks.

The signals recorded in the random test emission area 79 include relatively long mark pulses 27A (10T or longer, for example) and relatively long space pulses 26A (10T or longer, for example). This random test signal is output from test signal generator 54. These long mark parts and long space parts are selectively used as detection signals for feedback control in the random test emission area 79.

Pulses for relatively long marks and spaces are selected for use as the detection signal because they make it relatively easy to achieve the frequency characteristic required by the signal processing circuit for bottom detection and multipulse average detection as further described below.

The pulse signals in the data signal recording area 21 in the second recording start period are described next. The user data signal 9 recorded in area 21 is a substantially random signal because the signal is scrambled before recording. Of the signal pulses recorded to disc, pulse 27 for a relatively long mark (10T or longer, for example) and pulse 26 for a relatively long space (10T or longer, for example) are therefore selected and used as the detection signal for feedback control in the data signal recording area 21.

FIG. 6(f) shows the semiconductor laser control areas on the optical disc. Feed-forward control is applied in the feed-forward control area 28 to compare the pulse signal detected in the test emission area 20 with a reference level equivalent to the target power level of the laser pulse and control the current flowing to the semiconductor laser to the target power level.

Each time a long space pulse 26 and long mark pulse 27 pair is detected in the random test emission area 79, the space pulse and mark pulse are compared step-by-step with the reference level equivalent to the target power level of the laser pulse in a continuous feedback control loop in the feedback control area 29A controlling current flowing to the semiconductor laser to maintain a desired target power level.

As described above, the pulse positions of relatively long recording marks and spaces can only be determined from probability and the probability is also low. The feedback control start time 30 can therefore also only be determined by probability based on the content of the user data signal 9.

Each time a long space pulse 26 and long mark pulse 27 pair is detected in the data signal recording area 21, the space pulse and mark pulse are compared step-by-step with the reference level equivalent to the target power level of the laser pulse in a continuous feedback control loop controlling current flowing to the semiconductor laser to maintain a desired target power level in feedback control area 29.

FIG. 6(g) shows the detection periods of the optical disc. The detection signal is described for the pulse signal periods shown in (e).

In the test emission area 20, the bottom dc level (Bdc) 31 is detected in the constant pulse bottom level (Pb) 23 period. The bias dc level (E) 32 is detected in the constant bias level (Pe) 24 period. The average (M1) 33 of plural multipulse trains is detected in the period where pulse level 25 is between the peak and bottom levels.

The detection signal in random test emission area 79 are described next.

The bias/space level (E) 37A for recording symbol spaces is detected in long space pulse 26A. Laser emission power is detected from the multipulse average (M2) 38A for recording marks and bottom detection level (Bk) 39A detecting the bottom envelope of the recording marks in the long mark pulse 27A period.

As in the data signal recording area 21, the bias/space level (E) 37 for recording symbol spaces is then detected in the long space pulse 26 period, and laser emission power is detected from the multipulse average (M2) 38 of the recording marks and bottom detection level (Bk) 39 detecting the bottom envelope of the marks in the long mark pulse 27 period.

With rewritable optical discs such as DVD-RW media it is therefore possible to control the semiconductor laser for intermittent recording by first using feed-forward control in a first recording start period to quickly settle the laser to a target power level, then apply feedback control using random test pulses and continue feedback control detecting long mark and long space pulses in a second recording start period while overwriting the test pulses written in the first recording start period with the user data signal.

It will be further noted that by controlling recording to a rewritable optical disc with the method described in FIGS. 6(a)–6(g) to overwrite the test emission area, the increment margin area 17 described in FIG. 1 is not needed, and incrementally written data can be recorded seamlessly to the previously recorded data area 16.

It is therefore possible to assure the continuity of the signal train comparably to signals recorded to DVD-ROM media because extraneous test pulses are not left recorded to the recorded track even when content is incrementally recorded in multiple sessions. That is, the beginning of an incremental data recording area appended to the disc continues seamlessly to and contiguously from the end of a previously recorded incremental data recording area.

By rapidly setting laser power to a target power level by first applying feed-forward control with test pulses and then applying feedback control using random test pulses in the first recording start period, the feedback control and detection operations used in the data signal recording area 21 simply continue the same control sequence. Stable recording power control can therefore be assured because there is no transient response delay due to changing from feed-forward control to feedback control at the start of data signal recording.

It will be further noted that the semiconductor laser control method shown in FIGS. 6(a)–6(g) can be applied to a semiconductor laser control device using the same control device configuration, signal detection and control operations described above with reference to FIGS. 2 to 5 by simply changing the detection and control timing as shown in FIGS. 6(a)–6(g).

Embodiment 3

FIGS. 7(a)–7(G) are used to describe a semiconductor laser control method according to a third embodiment of the present invention. More specifically, FIGS. 7(a)–7(g) show the chronological order of semiconductor laser control operations when incrementally writing to optical disc media that is not rewritable, such as DVD-R media.

Figure 7:
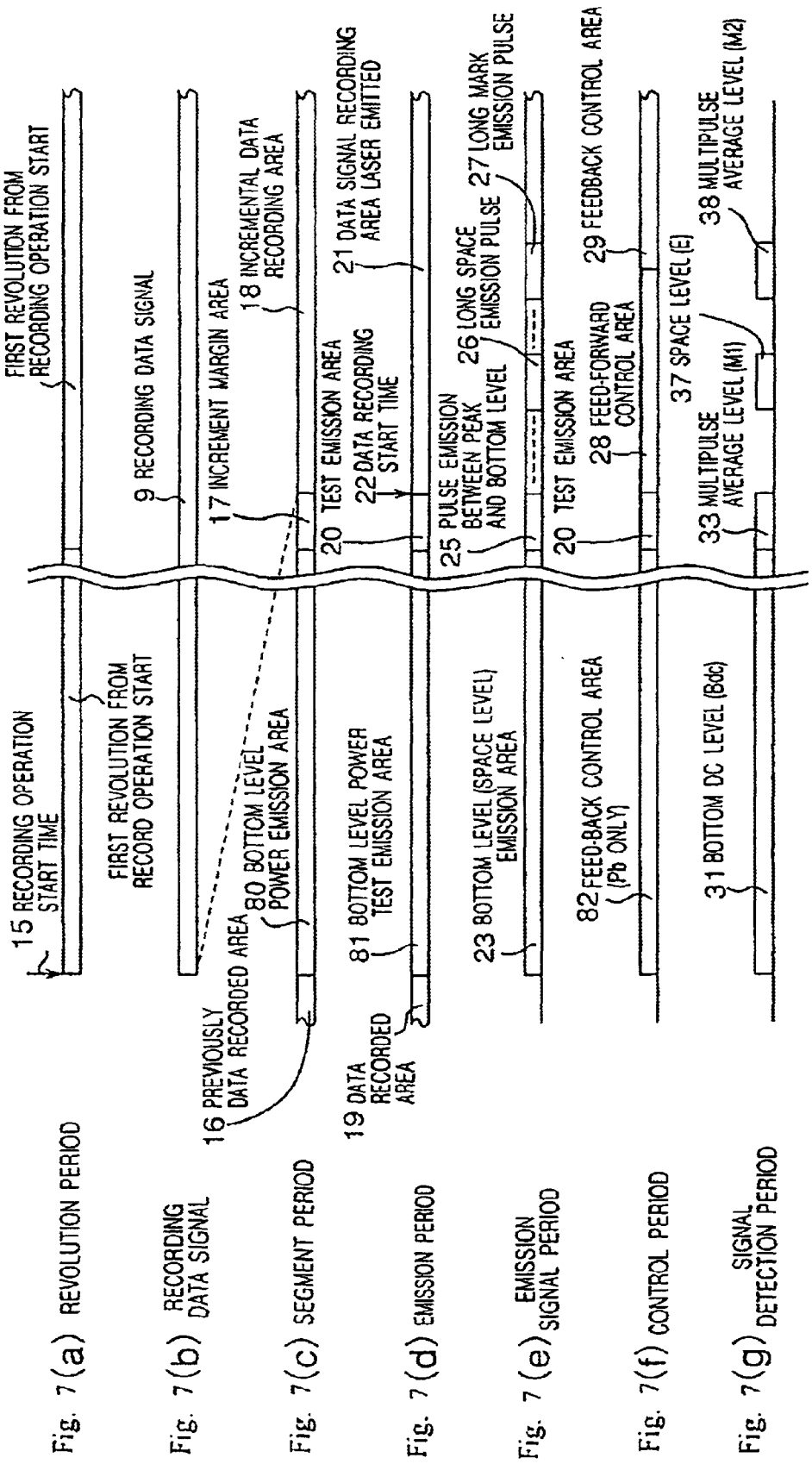
FIGS. 7(a)–7(g) show the operating sequence of a semiconductor laser control method according to a third preferred embodiment of the present invention.
Figure 8:
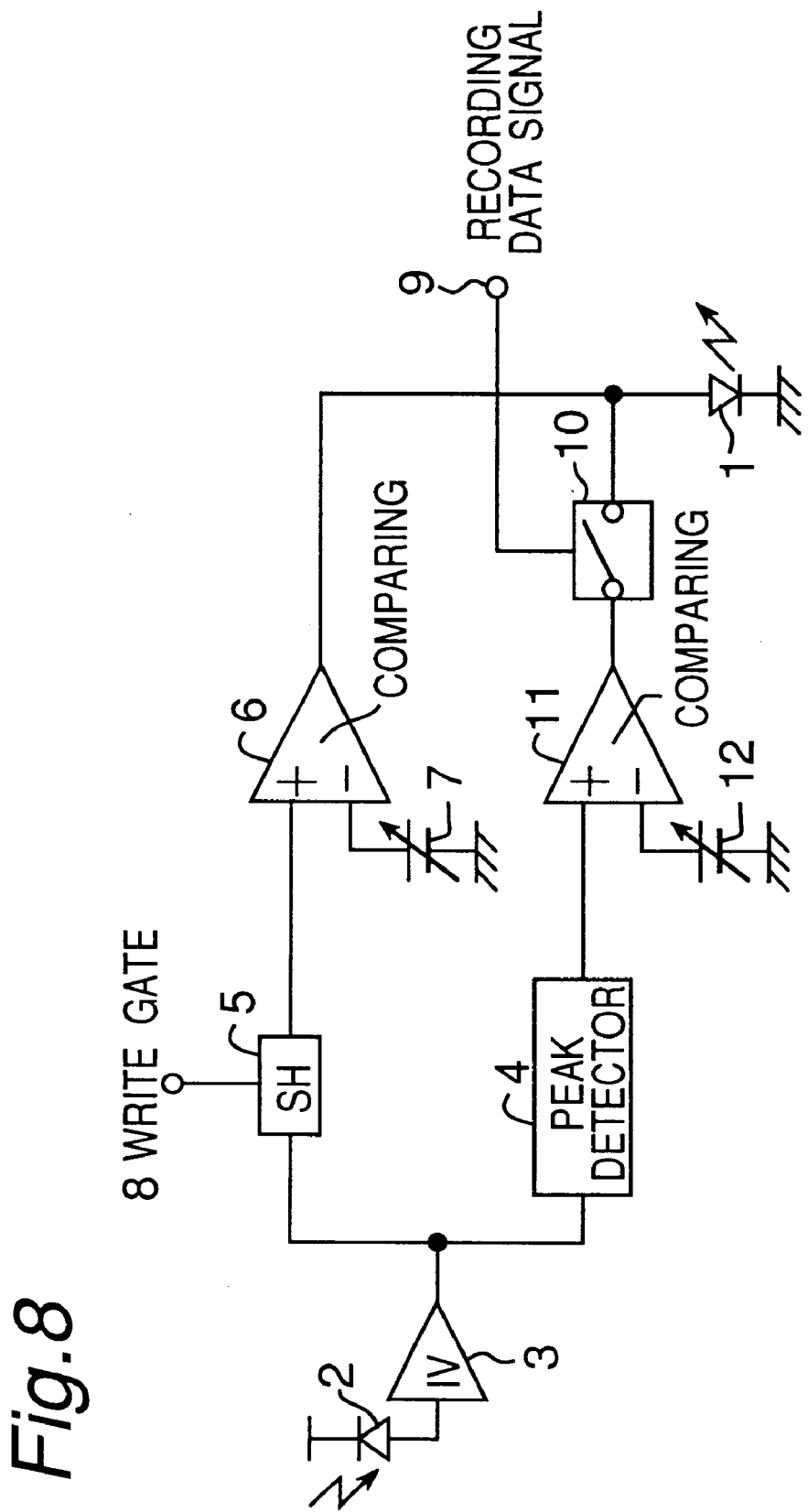
FIG. 8 shows the configuration of a semiconductor laser control device according to the prior art.

As shown in FIG. 7(a), a single track is segmented into first and second recording start periods. The first recording start period is from recording start time 15 to the increment margin area 17 immediately before data recording start time 22. The first recording start period is used as a test emission area for controlling the pulse bottom level of the semiconductor laser to a target power level.

A second recording start period is located after the increment margin area 17, and is used to record the desired user data signal 9 by jumping back to the same track used for test pulse recording to write the user data signal 9.

It should be noted that bottom level test pulses emitted in the first recording start period have no effect on the change in reflectivity of the recording layer of a writable optical disc such as DVD-R media.

FIG. 7(b) shows the user data signal 9 to be recorded to disc. The user data is sent from a host computer (not shown in the figure) at recording start time 15.

FIG. 7(c) shows the data recording areas on the optical disc. The area preceding recording start time 15 is previously recorded data area 16. The area following recording start time 15 to increment margin area 17 is bottom level pulse emission area 80.

FIG. 7(d) shows the semiconductor laser emission areas on the optical disc. Recorded data area 19 is located before recording start time 15.

The first recording start period from recording start time 15 is bottom level test emission area 81 (third test emission area) for feedback control of the pulse bottom level.

The second recording start period starting from the increment margin area 17 includes test emission area 20 (fourth test emission area) for feed-forward control of the recording power and data signal recording area 21 for recording the user data signal.

As shown in FIG. 7(b), the user data signal 9 is sent from a host computer in the first recording start period at recording start time 15, but actually recording the user data signal 9 to optical disc does not start until the second recording start period at data recording start time 22.

A FIFO or other type of buffer memory is therefore required to temporarily store the user data signal 9 in bottom level test emission area 81 and test emission area 20 because of this delay, equal to approximately one revolution, from recording start time 15 to the actual data recording start time 22.

FIG. 7(e) shows the actual pulse signal periods of the semiconductor laser 1 on optical disc. The laser is first driven to emit at the pulse bottom level (Pb) 23 in the bottom level test emission area 81. It will be remembered that the bias level for symbol spaces is the same as the bottom level 23 for recorded pulses in DVD-R media. Pulses at a level 25 between the pulse peak and bottom levels are recorded in the test emission area 20.

Relatively long mark pulses 27 (10T or longer, for example) and relatively long space pulses 26 (10T or longer, for example) are selected from the recording signal and used as the detection signal for feedback control in the data signal recording area 21.

FIG. 7(f) shows the semiconductor laser control areas on the optical disc. Each time a bottom level 23 pulse is detected in the bottom level test emission area 81, the pulse is compared with the bottom power setting, and continuous feedback control is applied in the feedback control period 82 to set current flowing to the semiconductor laser to the bottom power setting.

Feed-forward control is applied in the feed-forward control area 28 to compare the pulse signal between the peak and bottom levels detected in the test emission area 20 with the pulse peak level and control the current flowing to the semiconductor laser to the peak power level.

Each time a long space pulse 26 and long mark pulse 27 pair is detected in the data signal recording area 21, the space pulse and mark pulse are compared step-by-step with the reference level equivalent to the target power level of the laser pulse in a continuous feedback control loop in the feedback control area 29 controlling current flowing to the semiconductor laser to maintain a desired target power level.

FIG. 7(g) shows the detection periods of the optical disc. The detection signal is described for the pulse signal periods shown in FIG. 7(e).

In the bottom level test emission area 81 the bottom dc level (Bdc) 31 is detected in the constant pulse bottom level (Pb) 23 period. The space (bias dc) level (E) is the same as the bottom dc level (Bdc) 31 in DVD-R media.

The multipulse average (M1) 33 of the peak-bottom pulse level 25 is detected in the test emission area 20.

In the data signal recording area 21, the bias/space level (E) 37 is detected from the long space pulse 26 period. Laser emission power is detected from the multipulse average (M2) 38 of the recording marks in the long mark pulse 27 period.

As described above, when writing to an optical disc that is not rewritable, such as DVD-R media, with the semiconductor laser control method shown in FIGS. 7(a)–7(g), constant bottom level test pulses are detected for feedback control using only the bottom level in the first recording start period at the start of an incremental writing session, feed-forward control of the peak level is then used in the second recording start period by detecting the multipulse average in the test emission area, and feedback control is then applied continuously during data recording by detecting long mark and long space pulses in the data signal recording area.

When the control method shown in FIGS. 7(a)–7(g) is used with non-rewritable optical disc media, it is sufficient to emit only test pulses between the peak and bottom in the test emission area 20 immediately before the data recording start time 22. The test emission area 20 can therefore be shorter than that required with the control method shown in FIGS. 1(a)–1(j).

By thus shortening the test emission area 20, the area to which extraneous signals are recorded as a result of the test pulses written at the beginning of an incremental recording session can also be shortened, and tracks can therefore be recorded to DVD-R media with signal continuity closer to that of DVD-ROM media.

More specifically, the start of an incremental data recording area can be recorded so that there is a smaller gap to the end of a previously recorded session, and the recording track can therefore be formed with greater contiguity between recording sessions.

Furthermore, because feedback control of the pulse bottom level is completed in the first recording start period, feed-forward control in the second recording start period can be applied to the peak level only. Furthermore, because the number of feed-forward control operations required to quickly set current flow to the laser is reduced, the control method shown in FIGS. 7(a)–7(g) can be achieved using a slower, more affordable processor (DSP).

It will be further noted that the semiconductor laser control method shown in FIGS. 7(a)–7(g) can be applied to a semiconductor laser control device using the same control device configuration, signal detection and control operations described above with reference to FIGS. 2 to 5 by simply changing the detection and control timing as shown in FIGS. 7(a)–7(g).

As will be known from the preceding description, the present invention uses feed-forward control based on signals obtained from a test emission area. The pulse wave therefore does not have a gradual rise as shown in FIG. 10(a), and the peak power level can therefore be set instantaneously. Therefore, if the optical disc is recorded using a pulse wave as shown in FIG. 10(a), sufficient amplitude can be assured in the playback signal when playback starts as shown in FIG. 10(b).

When writing incrementally to an optical disc such as DVD-R or DVD-RW media, the present invention uses feed-forward control to quickly set the recording power of the semiconductor laser to a target power level immediately after the start of incremental recording, and continues feedback control for as long as data recording continues. It is therefore possible to provide a semiconductor laser control method and semiconductor laser control device that can maintain a stable laser recording power controlled to a target power level for a long period of time even when the current supply to the laser changes due to the temperature characteristics of the semiconductor laser when recording continues for a long time.

When recording to rewritable optical discs such as DVD-RW media, test pulses recorded to a test emission area in a first revolution are overwritten with the user data recorded during a second revolution writing to the same track. It is therefore possible to assure signal continuity comparable to that of DVD-ROM media with no gap between an appended data session and a previously recorded data area 16.

Furthermore, by applying both feed-forward control and feedback control during a first revolution at the start of recording, a transient response when switching to feedback control during data recording does not occur. This also makes it possible to provide a semiconductor laser control method and semiconductor laser control device enabling stable control of recording power.

Yet further, the test recording period immediately before the start of recording is shortened when writing incrementally to non-rewritable optical discs such as DVD-R media. The area to which extraneous signals are written as a result of recording test pulses recorded at the start of an incremental writing session is therefore shorter, and signal continuity closer to that of a DVD-ROM disc can be assured in the recorded track.

Yet further, feedback control of the pulse bottom level is completed within the first revolution at the start of recording. High speed feed-forward control operations are therefore only required for the peak level in the second revolution. It is therefore possible to provide a semiconductor laser control method and semiconductor laser control device enabling stable recording power control using a slower, lower cost processor (DSP).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the optical power of light pulses by modulating a semiconductor laser to at least two optical power levels according to a data signal for recording a mark area to an optical disc according to the data signal, said method comprising:

modulating light pulses with a test signal in a test emission area provided immediately before a data signal recording area for recording a data signal to an optical disc as light pulses modulated according to the data signal;

obtaining a first difference between a reference level equivalent to a target pulse power level and a photodetection signal obtained by sensing and converting the light pulses to an electrical photodetection signal;

applying feed-forward control so that the first difference converges to a first specified value;

controlling feed-forward current flowing to the semiconductor laser to a value equivalent to a target power level;

sensing the light pulses modulated according to the data signal in the data signal recording area;

converting the sensed light pulses to an electrical photodetection signal;

obtaining a second difference between a reference level equivalent to a target pulse power level and sample values obtained by sequentially sampling the photodetection signal at a specific sampling period;

applying feedback control so that the second difference converges to a second specified value; and controlling feedback current flowing to the semiconductor laser to a value equivalent to a second target power level.

2. A semiconductor laser control method as described in claim 1, wherein the test emission area and data signal recording area are provided in an area traced within one revolution of the optical disc by an optical head from the time at which the optical disc recording operation starts.

3. A semiconductor laser control method as described in claim 1, wherein test emissions in the test emission area include pulse emissions and continuous emissions at a constant level.

4. A semiconductor laser control method as described in claim 3, wherein test emissions in the test emission area include at least two of the following:

pulse emissions modulated between the peak and bottom levels of recording pulses emitted at recording marks in the data signal recording area, a constant emission at the pulse bottom level, and a constant emission at the space level emitted at recording symbol spaces.

5. A semiconductor laser control method as described in claim 1, wherein recording pulses in the recording mark area of the data signal recording area comprises recording a start pulse and plural multipulse trains, and wherein said controlling feedback current flowing to the semiconductor laser comprises sequentially sampling at a specific sampling interval and step-by-step comparing with a reference level equivalent to a light pulse target power level, either a) only the average of the plural multipulse trains, or b) the average and bottom level of the multipulse trains in the photodetection signal obtained by sensing, and converting to an electrical signal, the recording pulses in the recording mark period, and the space level of the photodetection signal obtained by sensing, and converting to an electrical signal, the recording pulses in the recording symbol space part.

6. A semiconductor laser control method as described in claim 1, further comprising storing the data signal for recording to the optical disc to buffer memory in the test emission area from the time at which the optical disc recording operation starts to the beginning of the data signal recording area.

7. A method for controlling the optical power of light pulses by modulating a semiconductor laser to at least two optical power levels according to a data signal for recording a mark area to an optical disc according to the data signal, said method comprising:

modulating a first set of light pulses with a first test signal in a first test emission area provided immediately before the a data signal recording area for recording a data signal to an optical disc as light pulses modulated according to the data signal;

obtaining a first difference between a reference level equivalent to a target pulse power level and a photodetection signal obtained by sensing and converting these light pulses to an electrical photodetection signal;

applying feed-forward control so that the first difference converges to a first specified value;

controlling feed-forward current flowing to the semiconductor laser to a value equivalent to a first target power level;

modulating a second set of light pulses with a second test signal in a second test emission area immediately following the first test emission area;

sensing and converting the second set of light pulses to an electrical photodetection signal;

obtaining a second difference between a reference level equivalent to a target pulse power level and sample values obtained by sequentially sampling the photodetection signal at a specific sampling period;

applying feedback control so that the second difference converges to a specific value; and controlling feedback current flowing to the semiconductor laser to a value equivalent to a target power level;

sensing the light pulses modulated according to the data signal in the data signal recording area;

converting the sensed light pulses to an electrical photodetection signal;

obtaining a third difference between a reference level equivalent to a target pulse power level and sample values obtained by sequentially sampling the photodetection signal at a specific sampling period, and applying feedback control so that the third difference converges to a third specified value; and controlling feedback current flowing to the semiconductor laser to a value equivalent to a third target power level.

8. A semiconductor laser control method as described in claim 7, wherein the first and second test emission areas are provided in an area traced within one revolution of the optical disc by an optical head from the time at which the optical disc recording operation starts, and the data signal recording area is provided in the area traced in a second revolution.

9. A semiconductor laser control method as described in claim 7, wherein test emissions in the first and second test emission areas include pulse emissions or continuous emissions at a constant level.

10. A semiconductor laser control method as described in claim 7, wherein first test emissions in the first test emission area include pulse emissions modulated between the peak and bottom levels of recording pulses emitted at recording marks in the data signal recording area, constant emissions at the pulse bottom level, and constant emissions at the space level emitted at recording symbol spaces.

11. A semiconductor laser control method as described in claim 7, wherein the second test signal consists of recording pulse emissions of random two-value data converted to a specific modulation sign at plural levels required for recording mark formation.

12. A semiconductor laser control method as described in claim 7, wherein recording pulses in the recording mark area of the data signal recording area comprises recording a start pulse and plural multipulse trains, and wherein said controlling feedback current flowing to the semiconductor laser comprises sequentially sampling and step-by-step comparing with a reference level equivalent to a light pulse target power level the average and bottom level of the plural multipulse trains of the photodetection signal obtained by sensing, and converting to an electrical signal, the recording pulses in the recording mark period, and the space level of the photodetection signal obtained by sensing, and converting to an electrical signal, the recording pulses in the recording symbol space part.

13. A semiconductor laser control method as described in claim 7, further comprising storing the data signal for recording to the optical disc to buffer memory in the first and second test emission areas from the time at which the optical disc recording operation starts to the beginning of the data signal recording area.

14. A method for controlling the optical power of light pulses by modulating a semiconductor laser to at least two optical power levels according to a data signal for recording a mark area to an optical disc according to the data signal, said method comprising:

emitting a semiconductor laser according to a first test signal in a first test emissions area provided before a data signal recording area for recording a data signal to an optical disc as light pulses modulated according to the data signal;

sensing and converting the first test signal to a first electrical photodetection signal;

sequentially sampling the first photodetection signal at specific sampling intervals and obtaining a first difference between the samples and a first reference level equivalent to a first target pulse power level;

applying feedback control converging the first difference to a first specific value;

controlling feedback current flowing to the semiconductor laser to a value equivalent to a first target power level;

modulating light pulses with a second test signal in a second test emission area provided after the first test emission area;

sensing and converting the light pulses to a second electrical photodetection signal;

obtaining a second difference between the second photodetection signal and a second reference level equivalent to a second target light pulse power level;

applying feed-forward control converging the second difference to a second specific value;

controlling feed-forward current flowing to the semiconductor laser to a value equivalent to a second target power level;

sensing and converting light pulses modulated by the data signal to an electrical photodetection signal in the data signal recording area;

sequentially sampling the photodetection signal at specific sampling intervals;

obtaining a third difference between the samples and a reference level equivalent to a third target light pulse power level;

applying feedback control converging the third difference to a third specific value; and controlling current flowing to the semiconductor laser to a value equivalent to a third target power level.

15. A semiconductor laser control method as described in claim 14, wherein the first test emission area is provided in an area traced within one revolution of the optical disc by an optical head from the time at which the optical disc recording operation starts, and the second test emission area and data signal recording area are provided in an area traced in a second revolution.

16. A semiconductor laser control method as described in claim 14, wherein test emissions in the first test emission area are continuous emissions at a constant level.

17. A semiconductor laser control method as described in claim 16, wherein test emissions in the first test emission area are continuous emissions at the bottom level of recording pulses emitted in the recording mark area of the data signal recording area or continuous emissions at the space level emitted in the recording symbol space part of the data signal recording area.

18. A semiconductor laser control method as described in claim 14, wherein test emissions in the second test emission area are pulse emissions modulated to a level between the peak and bottom levels of recording pulses emitted in the recording mark area of the data signal recording area.

19. A semiconductor laser control method as described in claim 14, wherein recording pulses in the recording mark area of the data signal recording area include a start pulse and plural multipulse trains, and wherein said controlling feedback current flowing to the semiconductor laser comprises sequentially sampling and step-by-step comparing with a reference level equivalent to a light pulse target power level, the average of the plural multipulse trains of the photodetection signal obtained by sensing, and converting to an electrical signal the recording pulses in the recording mark period, and the space level of the photodetection signal obtained by sensing and converting to an electrical signal the recording pulses in the recording symbol space part.

20. A semiconductor laser control method as described in claim 14, wherein the data signal for recording to the optical disc is temporarily stored to buffer memory in the first and second test emission areas from the timing at which the optical disc recording operation starts to the beginning of the data signal recording area.

21. A control apparatus for controlling the optical power of light pulses by modulating a semiconductor laser to at least two optical power levels according to a data signal for recording a mark area to an optical disc according to the data signal, said apparatus comprising:

means for modulating light pulses with a test signal in a test emission area provided immediately before a data signal recording area for recording a data signal to an optical disc as light pulses modulated according to the data signal, and obtaining a difference between a reference level equivalent to a first target pulse power level and a photodetection signal obtained by sensing and converting the light pulses to an electrical photodetection signal;

a feed-forward control means for controlling current flowing to the semiconductor laser to converge to a value equivalent to a first target power level;

means for sensing the light pulses modulated according to the data signal in the data signal recording area, converting the sensed light pulses to an electrical photodetection signal, and obtaining a difference between a reference level equivalent to a second target pulse power level and sample values obtained by sequentially sampling the photodetection signal at a specific sampling period; and a feedback control means for controlling current flowing to the semiconductor laser to a value equivalent to a second target power level.

22. A control apparatus for controlling the optical power of light pulses obtained by modulating a semiconductor laser to at least two optical power levels according to a data signal for recording a mark area to an optical disc according to the data signal, said apparatus comprising:

means for modulating light pulses with a first test signal in a first test emission area provided immediately before a data signal recording area for recording a data signal to an optical disc as light pulses modulated according to the data signal, and obtaining a first difference between a reference level equivalent to a first target pulse power level and a photodetection signal obtained by sensing and converting these light pulses to an electrical photodetection signal;

a feed-forward control means for controlling current flowing to the semiconductor laser to a value equivalent to a first target power level;

means for modulating light pulses with a second test signal in a second test emission area immediately following the first test emission area, sensing and converting these light pulses to an electrical photodetection signal, and obtaining a second difference between a reference level equivalent to a second target pulse power level and sample values obtained by sequentially sampling the photodetection signal at a first specific sampling period;

a feedback control means for controlling current flowing to the semiconductor laser to a value equivalent to a second target power level;

means for sensing the light pulses modulated according to the data signal in the data signal recording area, converting the sensed light pulses to an electrical photodetection signal, and obtaining a third difference between a third reference level equivalent to a third target pulse power level and sample values obtained by sequentially sampling the photodetection signal at a second specific sampling period; and a feedback control means for controlling current flowing to the semiconductor laser to a value equivalent to a third target power level.

23. A control apparatus for controlling the optical power of light pulses obtained by modulating a semiconductor laser to at least two optical power levels according to a data signal for recording a mark area to an optical disc according to the data signal, said apparatus comprising:

means for emitting a semiconductor laser according to a first test signal in a first test emissions area provided before the a data signal recording area for recording a data signal to an optical disc as light pulses modulated according to the data signal, sensing and converting the test signal to an electrical photodetection signal, sequentially sampling the photodetection signal at specific sampling intervals and obtaining a first difference between the samples and a reference level equivalent to a first target pulse power level;

feedback control means for controlling current flowing to the semiconductor laser to a value equivalent to a target power level;

means for modulating light pulses with a second test signal in a second test emission area provided after the first test emission area, sensing and converting the light pulses to an electrical photodetection signal, and obtaining a second difference between the photodetection signal and a reference level equivalent to a second target light pulse power level;

a feed-forward control means for controlling current flowing to the semiconductor laser to a value equivalent to a second target power level;

means for sensing and converting light pulses modulated by the data signal to an electrical photodetection signal in the data signal recording area, sequentially sampling the photodetection signal at specific sampling intervals, and obtaining a third difference between the samples and a reference level equivalent to a third target light pulse power level; and a feedback control means for controlling current flowing to the semiconductor laser to a value equivalent to a third target power level.

* * * * *

UNITED STATES PATENT AND TRADEMARK OFFICE
CERTIFICATE OF CORRECTION

PATENT NO. : 6,728,178 B2
DATED : April 27, 2004
INVENTOR(S) : Kenji Koishi et al.

It is certified that error appears in the above-identified patent and that said Letters Patent is hereby corrected as shown below:

Column 27,
Line 19, please replace the phrase "before the a" with -- before a --.

Signed and Sealed this

Seventh Day of September, 2004

JON W. DUDAS
*Director of the United States Patent and Trademark Office*